US009587752B2

(12) United States Patent
Montague

(10) Patent No.: US 9,587,752 B2
(45) Date of Patent: Mar. 7, 2017

(54) BACKFLOW PREVENTER VALVE

(71) Applicant: Sivan Valves, LLC, Brooklyn, NY (US)

(72) Inventor: Albert Montague, Deal, NJ (US)

(*) Notice: Subject to any disclaimer, the term of this patent is extended or adjusted under 35 U.S.C. 154(b) by 0 days.

(21) Appl. No.: 14/152,237

(22) Filed: Jan. 10, 2014

(65) Prior Publication Data
US 2014/0137949 A1 May 22, 2014

Related U.S. Application Data

(63) Continuation of application No. 11/810,946, filed on Jun. 6, 2007, now Pat. No. 8,627,847.

(60) Provisional application No. 60/811,676, filed on Jun. 6, 2006, provisional application No. 60/847,242, filed on Sep. 26, 2006, provisional application No. 60/905,386, filed on Mar. 6, 2007.

(51) Int. Cl.
*F16K 15/04* (2006.01)
*E03B 9/16* (2006.01)
*E03C 1/10* (2006.01)

(52) U.S. Cl.
CPC .............. *F16K 15/04* (2013.01); *E03B 9/16* (2013.01); *E03C 1/104* (2013.01); *F16K 15/048* (2013.01); *Y10T 137/3294* (2015.04); *Y10T 137/5491* (2015.04); *Y10T 137/7869* (2015.04); *Y10T 137/791* (2015.04); *Y10T 137/8593* (2015.04)

(58) Field of Classification Search
CPC .......... F16K 15/04; F16K 15/048; E03B 9/16; E03C 1/104; Y10T 137/7869; Y10T 137/3294

USPC .................. 137/517, 539, 533.11
See application file for complete search history.

(56) References Cited

U.S. PATENT DOCUMENTS 2,664,096 A * 12/1953 Murdock et al. .............. 137/218
3,466,819 A *  9/1969 Giger .................................. 52/1
3,498,315 A *  3/1970 Hester et al. .................. 137/375
(Continued)

*Primary Examiner* — Craig Schneider
*Assistant Examiner* — P. Macade Nichols
(74) *Attorney, Agent, or Firm* — Kramer Levin Naftalis & Frankel

(57) ABSTRACT

An insertable backflow preventer is presented. The backflow preventer is provided with a cylindrical housing. The housing has a flow transition zone, a proximal orifice/ball seat, a ball with a specific weight that equals or is close to the specific weight of the surrounding fluid, and a distal retaining screen. The housing can have a flange provided on the outside of the housing at one end to facilitate securing the valve in a pipe. The valve is self-cleaning, can be placed in any orientation in a pipe and has low hydraulic head-loss. The valve's unique cost-effective design provides for easy and relative quick installation, eliminates the need to reconfigure existing plumbing, and can be performance tested remotely. Properly installed, it can dramatically improve the security of, for example, potable water sources in a building or other context, and inasmuch as when installed it is not visible, it is tamper proof. The valve can be scaled to any size pipe or tube, and due to its internal flow dynamics is self cleaning. Multiple valves can be installed in series, and balls of varying specific weight can be used in each valve in such a series to allow for contexts where a range of fluids are sent through the same line, or to provide fail-safe operation in the event that contaminants change the specific gravity of the fluid.

20 Claims, 37 Drawing Sheets

(56) References Cited

U.S. PATENT DOCUMENTS

| | | | | |
|---|---|---|---|---|
| 3,584,644 A | * | 6/1971 | Morken | 137/426 |
| 4,263,936 A | * | 4/1981 | Brown | 137/496 |
| 4,655,247 A | * | 4/1987 | Westra et al. | 137/519.5 |
| 4,756,335 A | * | 7/1988 | Kim | 137/519.5 |
| 5,195,552 A | * | 3/1993 | Nehm | 137/269 |
| 5,816,313 A | * | 10/1998 | Baker | 165/41 |

* cited by examiner

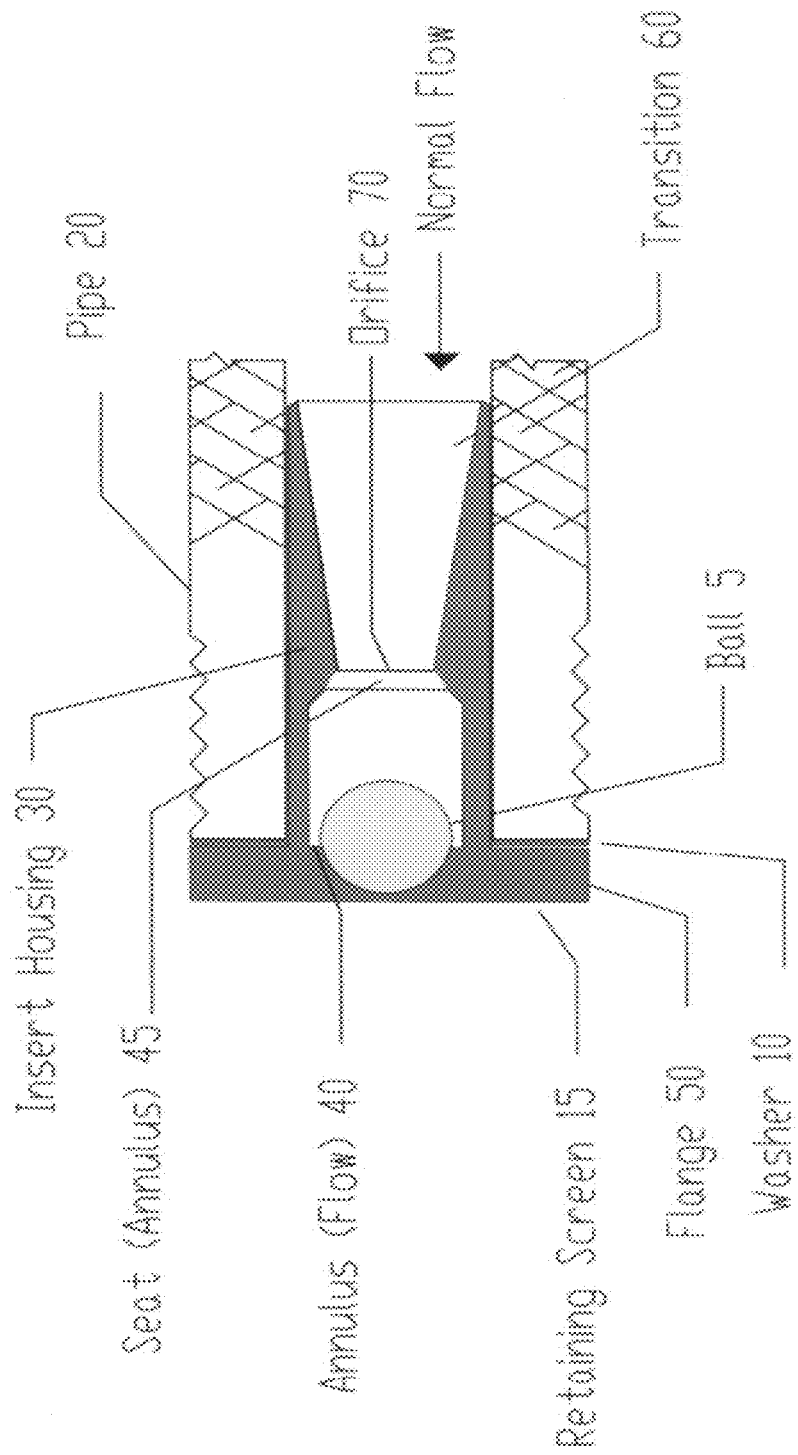
Fig. 1 - Normal Flow

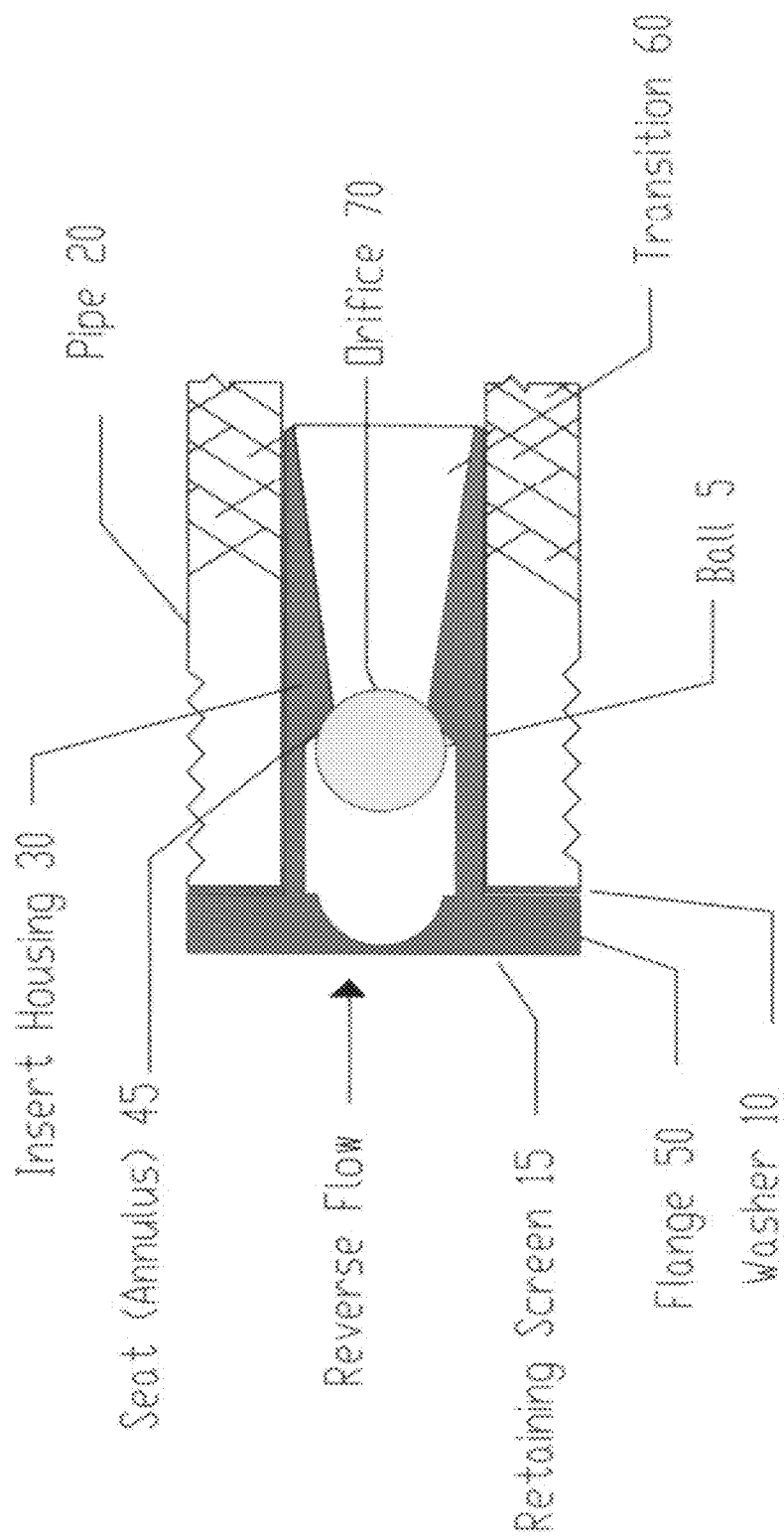
Fig. 2 - Backflow

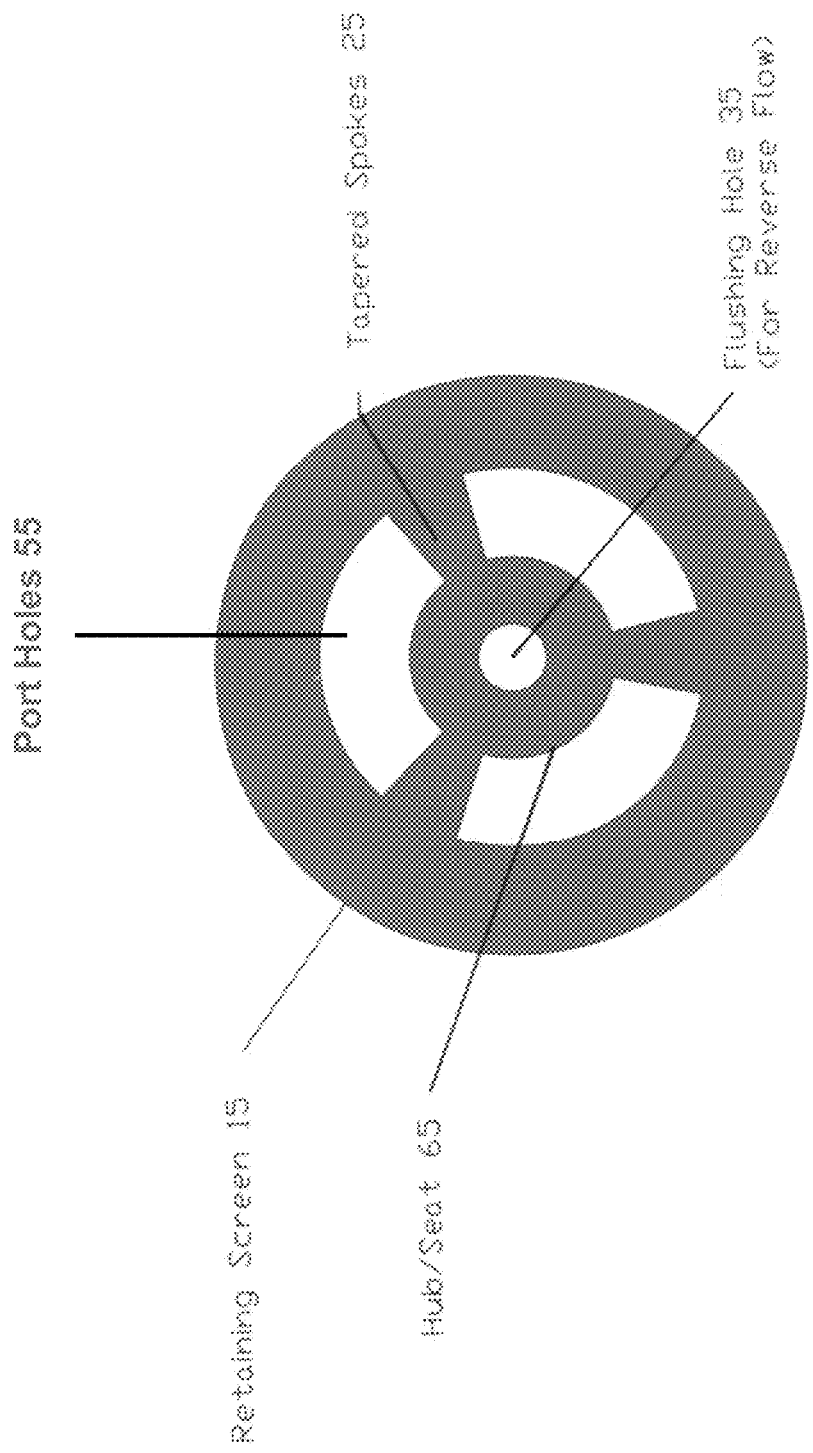
Fig. 3 - Exemplary Retaining Screen

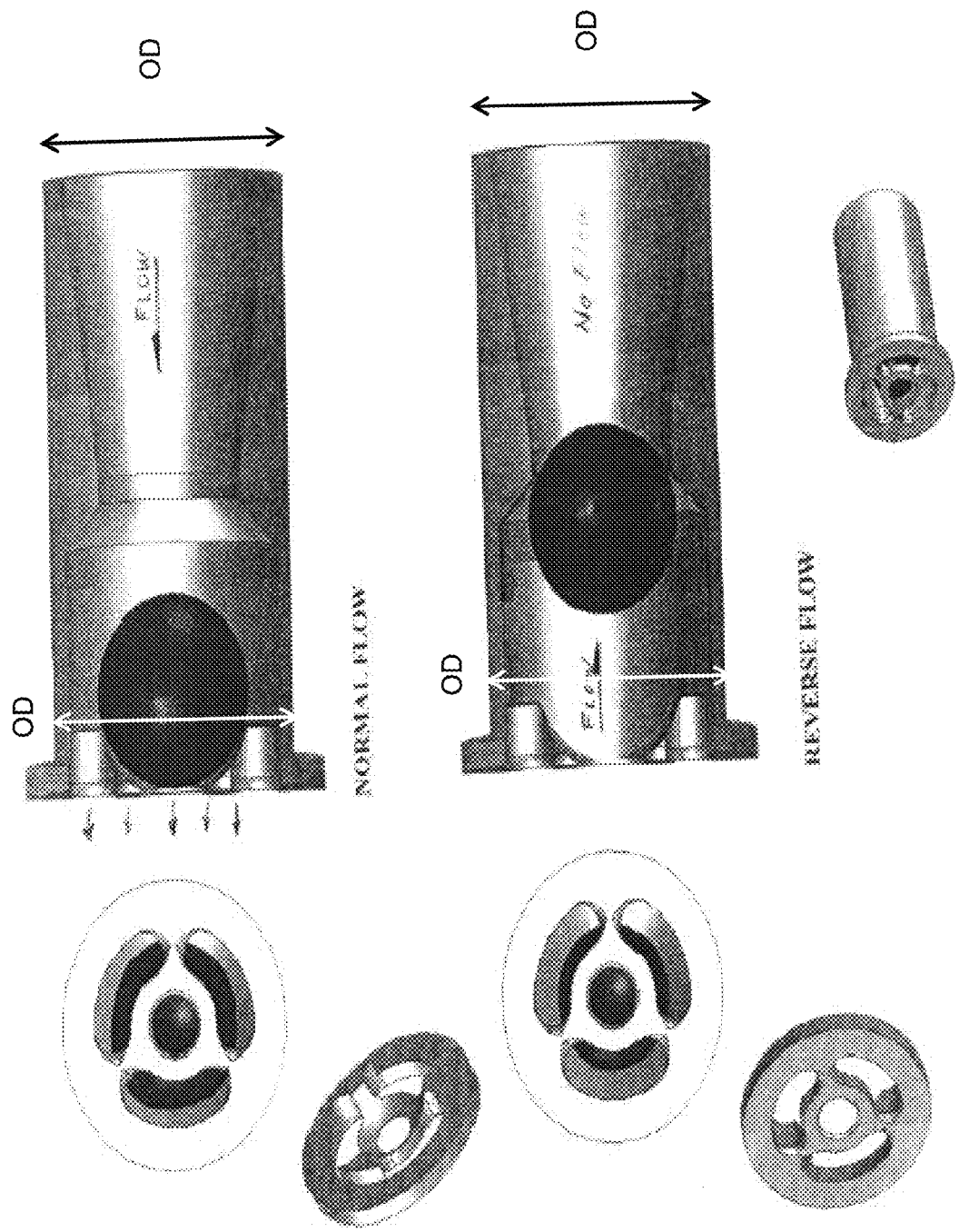

Fig. 5 - Longitudinal Cross Sectional of BFP Installed in a Pipe

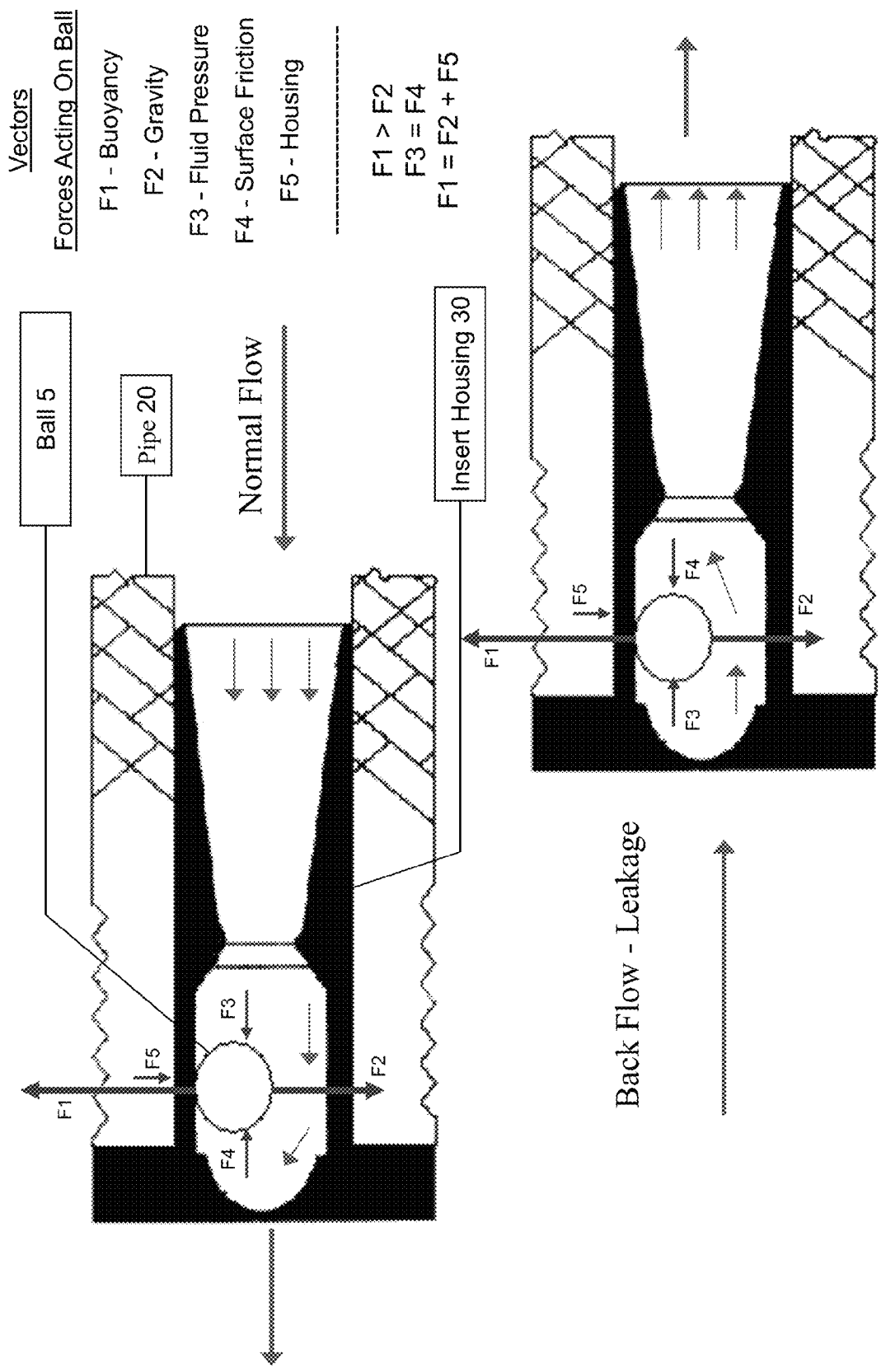
Fig. 6(a) - Low Flow/ Low Relative Specific Weight

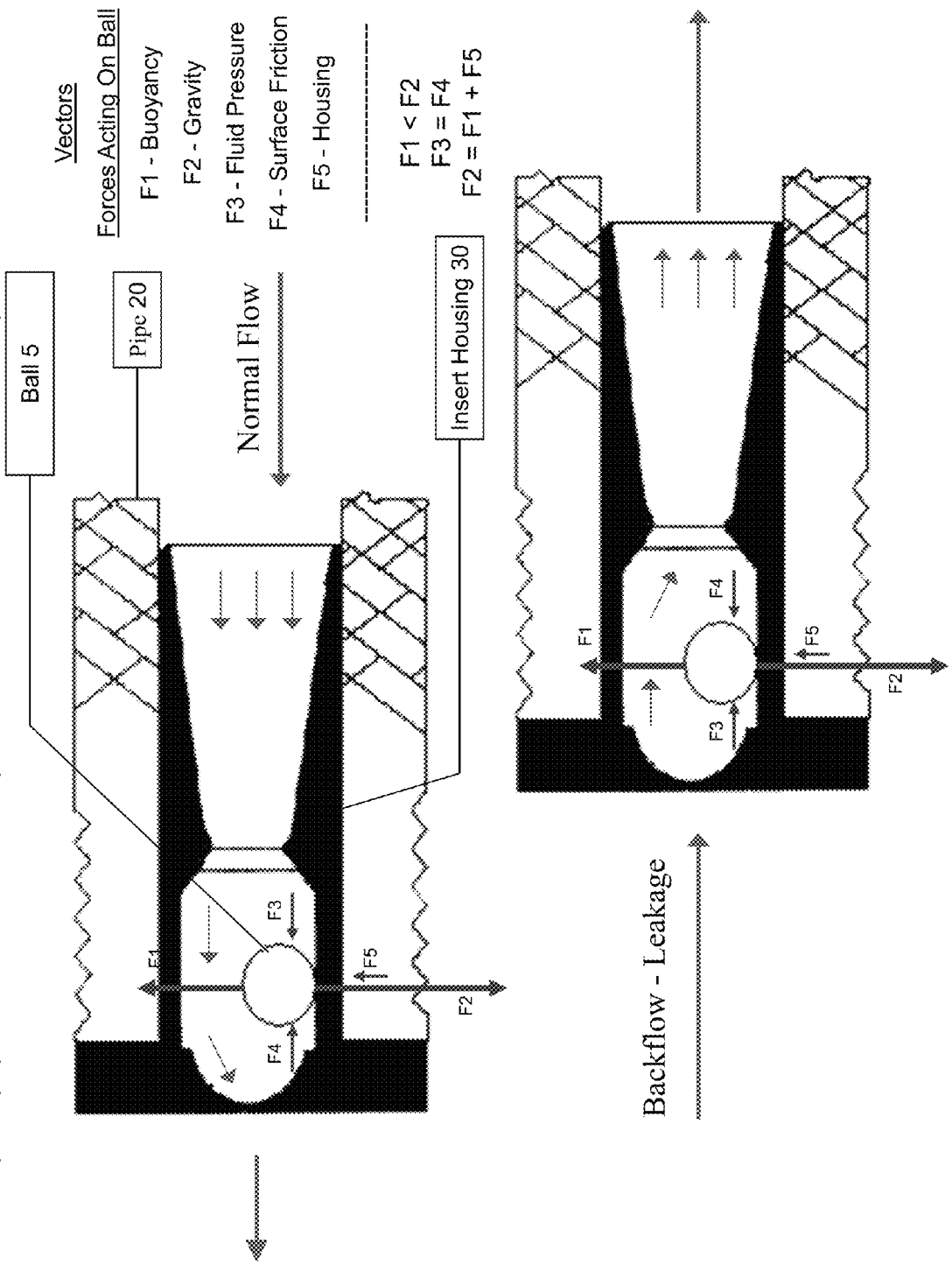
Fig. 6(b) - Low Flow/High Relative Specific Weight

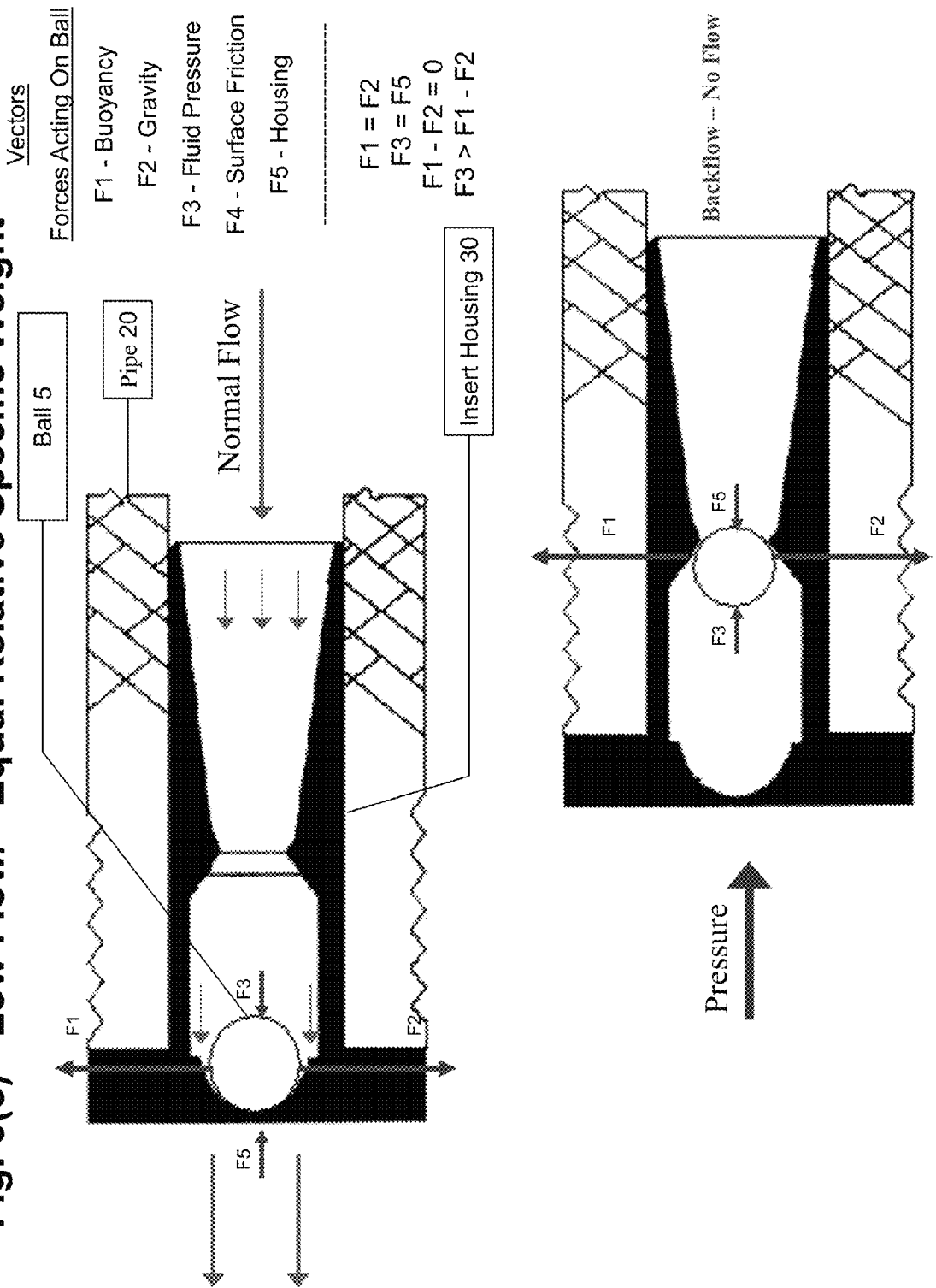

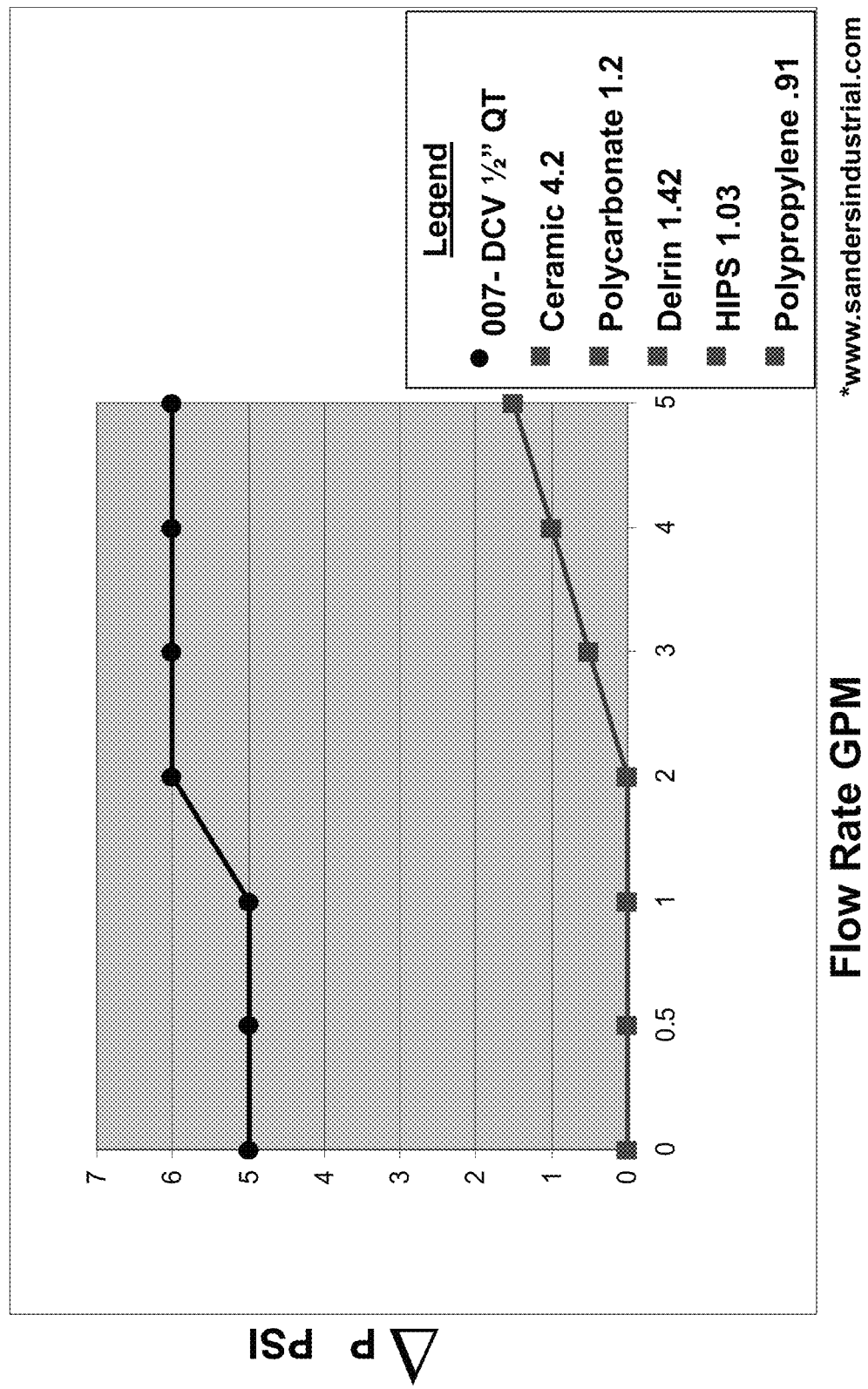
Fig. 7 - Flow Rate vs. Head Loss

Figure 12: Conventional Shutoff Valve Connected to Conventional Flapper Check Valve Figure 13: Shutoff Valve with Exposed View of Backflow Preventer Insert Valve Figure 14: Shutoff Valve with Partially Exposed View of Backflow Preventer Insert Valve Figure 15: Shutoff Valve with Hidden Backflow Preventer Insert Valve Figure 16: Rear End View (Discharge)- Retaining Screen of Backflow Preventer Insert Valve Figure 17: Inside View of Check Ball Seated on Retaining Screen of Backflow Preventer Insert Valve Figure 18: Inside View of Retaining Screen of Backflow Preventer Insert Valve Figure 19: Front End View (Inlet) - Backflow Preventer Insert Valve without Check Ball Figure 20: Check Ball Orifice and Seat of Backflow Preventer Insert Valve Figure 21: Check Ball Seated Sealing Orifice of Backflow Preventer Insert Valve Figure 22: Rear End View (Discharge) - Retaining Screen of Backflow Preventer Insert Valve Check Ball Visible and Seated in Orifice Figure 23: Front End View (Inlet) - Backflow Preventer Insert Valve with Check Ball Seated On Retaining Screen Figure 24: Side View of Backflow Preventer Insert Valve Assembled with Gasket Figure 25: Side View of the Backflow Preventer Insert Valve Disassembled Fig. 29  Top View - Hydrant Retrofit Assembly with Dual BFP Insert Valves Front View - Hydrant Retrofit Assembly with Dual BFP Insert Valves Side View - Hydrant Retrofit Assembly with Dual BFP Insert Valves New Hydrant with Dual BFP Inserts

NOT TO SCALE

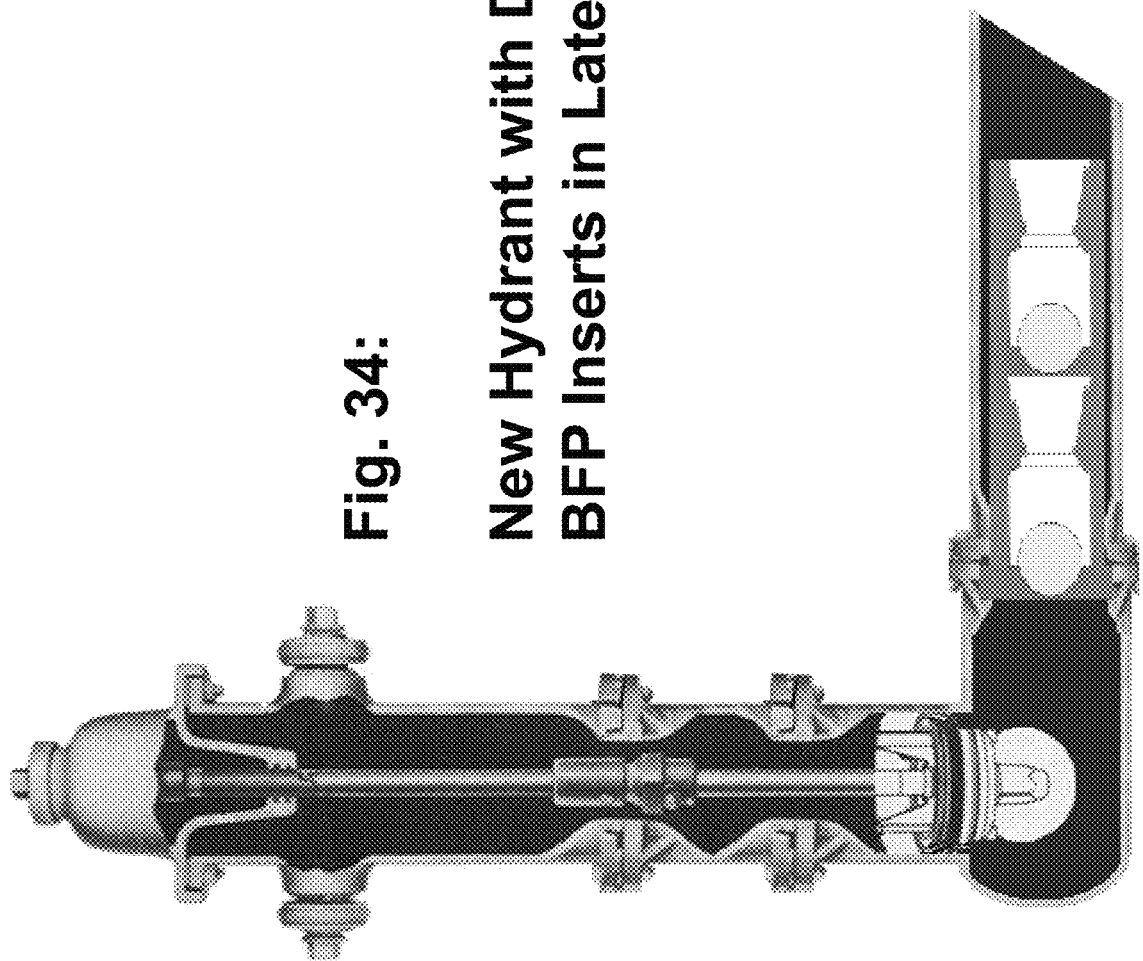
Fig. 34: New Hydrant with Dual BFP Inserts in Lateral Pipe
NOT TO SCALE

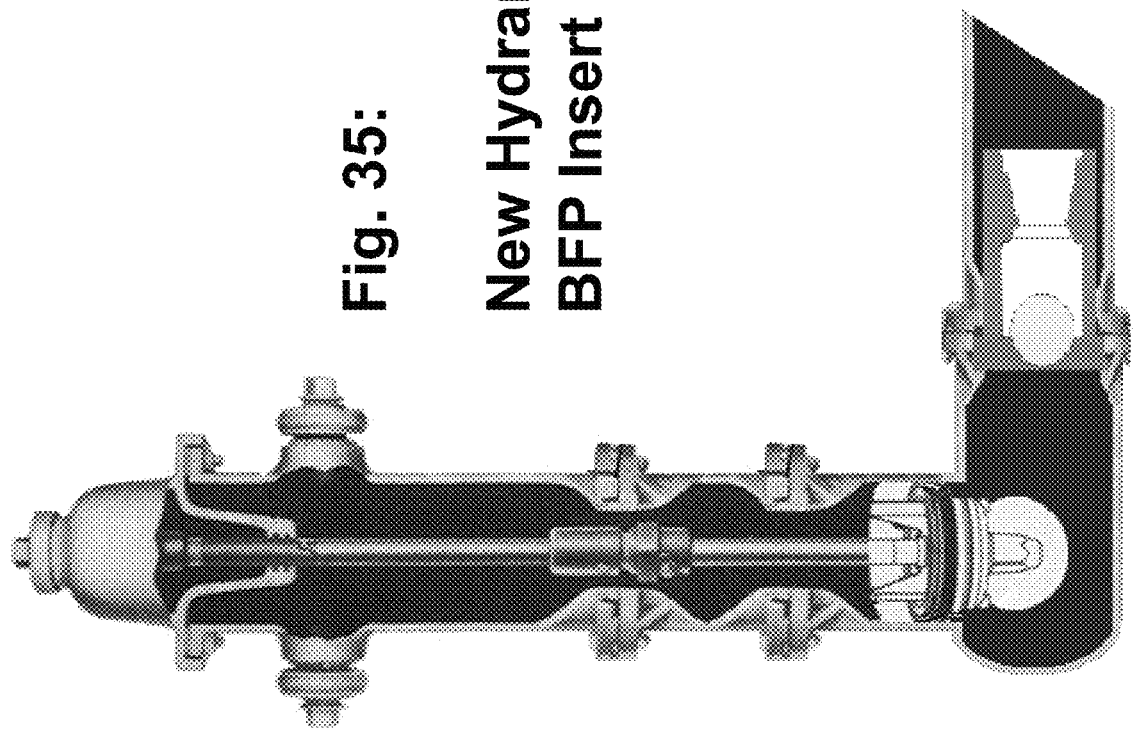
Fig. 35: New Hydrant with Single BFP Insert in Lateral Pipe
NOT TO SCALE

BACKFLOW PREVENTER VALVE

CROSS REFERENCE TO RELATED APPLICATIONS

This application is a continuation of U.S. application Ser. No. 11/810,946 filed Jul. 6, 2007, which claims the benefit of U.S. Provisional Patent Application Ser. Nos. 60/811,676, filed on Jun. 6, 2006; 60/847,242, filed on Sep. 26, 2006; and 60/905,386, filed on Mar. 6, 2007, which are hereby incorporated herein by reference in their entirety.

TECHNICAL FIELD

The present invention relates to water delivery systems, and in particular to a backflow preventer valve for use to increase the security of, and prevent tampering with, water supplies.

BACKGROUND OF THE INVENTION

Backflow preventers are used to prevent contamination of a budding and/or public water distribution system by reducing or eliminating backflow of a contaminated hazardous fluid into the respective system(s). Conventional backflow preventers are mechanically sophisticated devices, that are threaded for pipes, unthreaded for tubing, or flanged at each end so they can be installed, i.e., spliced into the piping system. Conventional backflow preventers require periodic inspection, testing, maintenance and repair. Therefore, they must be visible and accessible. As such they are not tamper resistant or tamperproof. A conventional backflow preventer is usually, but not always, installed in a pipeline between a main municipal water supply line and a service line that feeds an installation, e.g., hospital, industrial building, commercial establishments, multiple or single family residences. A conventional backflow prevention valve is an assembly that typically includes two check valves that are configured to permit fluid flow in one direction, such as from a main municipal water supply distribution pipe system to a particular building's service (pipe) line. They are generally costly to purchase and, always labor intensive to install. Conventional backflow preventers are commonly used in buildings equipped with chemical processing equipment, sprinkler systems, etc. Backflow preventers are required by applicable plumbing codes to protect a building's potable water supply from accidental contamination, a condition that would occur from a cross connection and flow reversal in a branch or pipe riser, due to a process or system malfunction. Left unchecked, hydraulic reversal can compromise the quality and safety of a building's potable water supply system and, potentially, the municipal water supply distribution system as well. Nonetheless, current plumbing design and operating codes are essentially silent regarding protective measures against the willful intent of an individual (such as, for example, a terrorist, criminal, etc.) to inject a toxic contaminant into a building's potable water supply plumbing system and possibly the municipal water supply system, including fire hydrants, as well.

Historically, a typical backflow preventer consisted of a mechanical single spring-loaded check valve in a water supply line, generally placed between a pair of gate-type shutoff valves. Current building codes, however, now require backflow preventers to include a pair of independently spring-loaded positive check valves. The motivation behind such a rule is that should one of the check valves fail, the second valve can serve as a backup. Because of their mechanical complexity, current plumbing codes typically require that the check valve(s) be replaceable and repairable while on-line, that is, without shutting down the system. In contrast, current plumbing codes for commercial, industrial, multi-story residential buildings and single homes do not require the installation of backflow preventers. This leaves such buildings' internal potable drinking water supply vulnerable to compromise via injection of a toxic chemical or biological contaminant into the building's water supply system, with the added possibility of contaminating the municipal water supply distribution system in the process. The latter could compromise the water quality of an entire regional water distribution grid. In light of the health and safety concerns previously described, it is imperative that appropriate measures be immediately initiated to address and bridge this critical gap in security as it relates to existing and future potable drinking water systems.

While municipal codes generally require the replacement of single check valves with a double check valve backflow preventer, simply requiring building owners to undertake major re-plumbing to install these backflow preventers between the municipal water service distribution lines located in the street and downstream of the building's water meter would not address the vulnerability to intentional internal contamination within a given building. Retrofitting a conventional backflow preventer to protect a building's internal potable water distribution system from possible intentional contamination at every point-of-use water supply terminus, such as, for example, via shutoff valves for kitchen and bathroom fixtures, drinking water fountains, etc., could be very expensive. Each existing supply line would have to be re-plumbed to provide space to accommodate a single conventional check valve assembly. Moreover, access for repair and replacement must be provided for each such back flow preventer to provide for proper maintenance, since these devices are generally internally mechanically complex. Even in new construction, installation of conventional back flow preventers for each point-of-use fixture would be costly.

As noted in a Jun. 18, 2004 article entitled "Cross Connection Control Programs And Backflow Preventers Are Essential Components of Safe Drinking Water Systems," published on Backflow Prevention TechZone (a trade web site at URL http://www.backflowpreventiontechzone followed by .com), plumbing system cross connections between potable and non-potable water supplies, water using equipment, and drainage systems, continue to be a serious potential public health hazard worldwide. Anywhere people congregate and utilize communal water supplies, water using equipment, and drainage systems, the danger of un-protected cross connections continue to threaten public health. Thus, there is a widening recognition that properly installed, maintained, and tested backflow prevention devices are critical elements of safe drinking water systems in our communities and workplaces. The report further noted that backflow preventer device development, beyond simple check valves, began to accelerate and diversify in the mid-20th century, but potable ("city") water piping systems and water using equipment, especially inside industrial and medical buildings, have grown exponentially in complexity and are also continuously altered. Surveys over the decades have shown that water using devices and equipment which can contaminate a drinking water system continue to be connected to potable waterlines without properly selected, permitted, installed, maintained, and if appropriate for the device, tested and certified, backflow preventer valves. Thus, "despite decades of new public health and occupational safety laws, as well as updated and revised plumbing codes, along with new improved backflow preventer devices, the cross connection problem continues to be an ongoing dynamic one."

The most universal backflow hazards are constantly recreated, such as in cross-connections within residential and public washrooms, and ordinary, unprotected from backflow, hose connections. The bathroom continues to be a repository of one of the subtle yet potentially dramatic backflow hazards found recurrently in homes and public places. Many local health departments have "blue water" flowing from the kitchen sink reports in their archives, which may well be only the tip of the iceberg of undocumented incidents of actual backflow from an unapproved or improperly installed toilet fill-valve assembly.

As further noted in the report cited above, recent cross connection inspection surveys (USC/FCCCHR) continue to reveal that the most prevalent and potentially hazardous potable water plumbing cross connection is the common hose connection (or hose bib) (UF/IFAS, 3/95) found in virtually every home and building. The predominant cause for the cross connection, known as backsiphonage, is the sudden and significant loss of hydraulic pressure in the water main. Excessive drops in water pressure, have historically, been attributed to a broken water main, a fire nearby where the Fire Department is using large quantities of water, or by a water company official opening a fire hydrant to test it. Buildings near a municipal water main break or a fire hydrant being opened will experience a lowering of the water pressure and possibly backsiphonage.

Conventionally, potable water backflow protection has been addressed by various valve types, having unique design configurations. Such designs include, for example, Air Gap, Atmospheric Vacuum Breaker, Pressure Vacuum Breaker, Double Check Valve, and Pressure Reducer. Such devices are external in their intended application, limited to a specific installation orientation, e.g., vertical or horizontal, visible, must be easily accessible and are thus vulnerable to tampering, are mechanically complex to the extent that periodic inspections and maintenance are required and without proper servicing are unreliable in the long term, and are operationally affected by gravity in whole or part.

For example, the air gap backflow preventer, considered by some to be the "ultimate" backflow preventer, is totally reliant on gravity to operate properly, and must be installed in an external manner. In addition, all conventional backflow preventers, because of their inherent design, are prone to clogging and fouling. Four of the five aforementioned must utilize a plurality of individual valve means and springs to prevent backflow. Such mechanical complexity actually fosters corrosion, clogging and/or fouling, and thus are unsuitable to resolve in a cost-effective manner the aforementioned public drinking water supply safety concerns. Additionally, conventional backflow valves require a great deal of effort in both labor and material to be installed, and as a result of their design must always be readily accessible, i.e., exposed, to provide for required periodic maintenance. Such valves thus offer a perfect access point for a terrorist.

A recent GAO-04-29 report to the United States Senate Committee on Environment specifically referenced fire hydrants as a top vulnerability. Moreover, as recently reported by the American Water Works Association on May 2, 2007, terror training manuals found in Afghanistan showed plans to contaminate America's water supply.

Thus, there is a compelling need for a backflow preventer device that is simple in its design and operation, not visible from publicly accessible areas, tamper-resistant, easy to install in any plumbing piping configuration, essentially maintenance free, and truly cost-effective to manufacture, install and operate.

SUMMARY OF THE INVENTION

An insertable backflow preventer is presented. The backflow preventer is provided with a cylindrical housing, and can be easily inserted into any standard size NPS pipe or copper tube. The apparatus can also have an external flange at one end to secure its position when inserted into the exposed end of a pipe or tube, as the flange insures that the check valve can never be inserted backwards. The housing can have a flow transition zone, a proximal orifice/ball seat, a ball with a specific weight that is a function of that of the surrounding fluid, and a distal retaining screen. The housing can have a flange provided on the outside of the housing at one end to facilitate securing the valve in a pipe. The valve can be self-cleaning, can be placed in any orientation in a pipe and has low hydraulic head-loss. The valve's unique cost-effective design provides for easy and relative quick installation, eliminates the need to reconfigure existing plumbing, and can be performance tested remotely. Properly installed, it can dramatically improve the security of, for example, potable water sources in a building or other context, and inasmuch as when installed it is not visible, it is tamper proof. The valve can be scaled to any size pipe or tube. Multiple valves can be installed in series, and balls of varying specific weights can be used in each valve in such series to allow for contexts where a range of fluids are sent through the same line, or to provide fail-safe operation in the event that contaminants change the specific gravity of the fluid. The housing can have a fluid inlet, a main flow conduit and a fluid outlet. The caged ball can move freely within the internal space between the distal retaining screen and the proximal orifice/seat, essentially longitudinally. The movement and position of the ball within the valve is governed by the direction and rate of flow of the fluid surrounding the ball. In exemplary embodiments of the present invention the ball and internal structures of the entire apparatus can be made smooth so as to minimize fluid head-loss, insure that the caged suspended ball can move freely therein, seat correctly in the valve orifice/seat, and instantly respond to changes in fluid pressure, whether large or small, and direction.

BRIEF DESCRIPTION OF THE DRAWINGS

FIG. 1 illustrates a cross-sectional view of an exemplary insertable backflow preventer under a normal flow (forward flow) condition according to an exemplary embodiment of the present invention;

FIG. 2 illustrates an exemplary cross-sectional view of an exemplary insertable backflow preventer under a backflow (reverse flow) condition according to an exemplary embodiment of the present invention;

FIG. 3 illustrates an end view of an exemplary retaining screen according to an exemplary embodiment of the present invention;

FIG. 4 depicts an exemplary operational illustration of an insertable backflow preventer according to an exemplary embodiment of the present invention;

FIG. 5 is a longitudinal cross sectional perspective view of an exemplary backflow preventer installed in a pipe according to an exemplary embodiment of the present invention;

FIGS. 6(a)-(c) depict exemplary force diagrams for an exemplary backflow preventer insert valve according to an exemplary embodiment of the present invention;

FIG. 7 is a graph of flow rate versus head loss for an exemplary backflow preventer valve according to an exemplary embodiment of the present invention;

FIG. 34 depicts an exemplary new fire hydrant with dual BFP inserts in a lateral pipe according to an exemplary embodiment of the present invention; and FIG. 35 depicts an exemplary new fire hydrant with a single BFP insert in a lateral pipe according to an exemplary embodiment of the present invention.

It is noted that the patent or application file contains at least one drawing executed in color. Copies of this patent or patent application publication with color drawings will be provided by the U.S. Patent Office upon request and payment of the necessary fee.

DETAILED DESCRIPTION OF THE INVENTION

The present invention will be described with reference to various exemplary embodiments. It should be understood that none of such descriptions are limiting, and all descriptions of exemplary embodiments and their respective components are exemplary, and for illustrative purposes. The present invention is understood to be capable of implementation in various other embodiments and variations of embodiments than those described herein, as will be understood by those skilled in the art.

In exemplary embodiments of the present invention, an insertable backflow preventer valve (hereinafter sometimes referred to as a "BFP") can have a ball, and a valve housing. The housing can be provided in two parts which can, for example, be screwed together to hold the ball therebetween. The housing can have, for example, a retaining screen on its front end (the distal, or outflow side) and a sealable orifice at its rear end (the proximal, or inflow side). The retaining screen can be provided so as to provide for normal flow through it with minimal head loss, and the sealable orifice can be provided such that the ball closably seals with it in a backflow condition. The valve housing can have a flow transition zone so as to obviate forward flow head pressure loss. In normal operation (forward flow) the ball seats in a hub at the center of the retaining screen, and rotates in a random manner on a thin layer of fluid between it and said hub, providing for a self cleaning action. Various aspects of exemplary BFPs according to exemplary embodiments of the present invention are next described.

FIG. 1 illustrates a cross-sectional view of an exemplary insertable backflow preventer according to an exemplary embodiment of the present invention. Visible are a thin walled cylindrical housing 30 having an outside diameter that is slightly smaller than the internal diameter of pipe 20, thus providing means for the unobstructed insertion of said insertable backflow preventer assembly into the exposed end (left side of figure) of pipe 20. The assembly can be positioned in any orientation, i.e., horizontal or vertical, when a given plumbing supply system's shutoff valve (not shown) is removed.

While FIGS. 1-11 are schematics, FIGS. 16-25 depict an actual exemplary BFP prototype according to an exemplary embodiment of the present invention. Thus, FIGS. 16-25 will be referred to illustrate various aspects of the description of FIGS. 1-4, using the same index numbers as shown in FIGS. 1-3 for convenience, index numbers not being reproduced on FIGS. 16-25 for ease of viewing.

Figure 24:
FIG. 24 depicts a side-view of a BFP and gasket according to an exemplary embodiment of the present invention.
Figure 25:
FIG. 25 is an expanded view of the BFP shown in FIG. 24.
Figure 26:
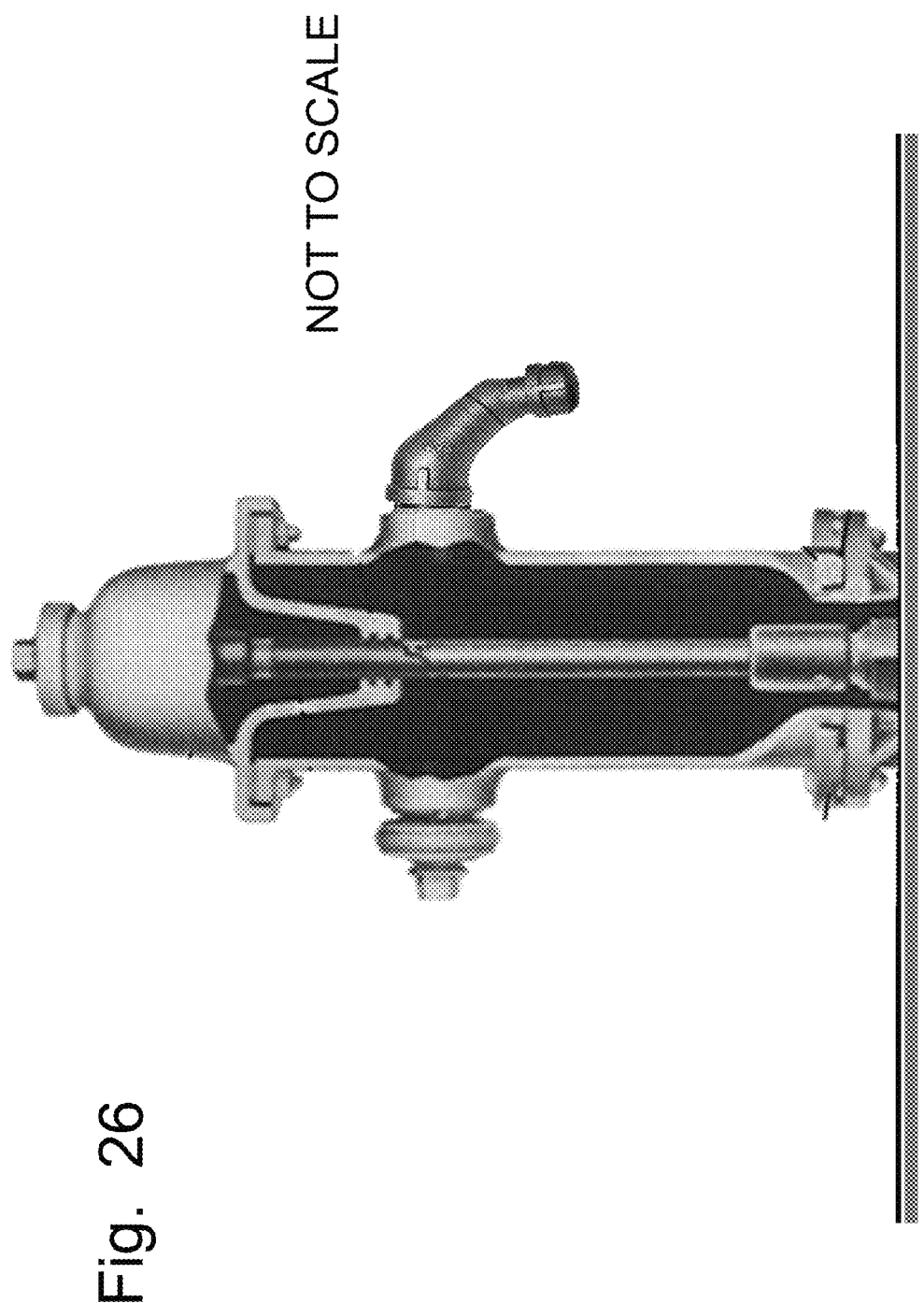
FIG. 26 depicts dual BFP insert valves in an exemplary fire hydrant retrofit according to an exemplary embodiment of the present invention.
Figure 27:
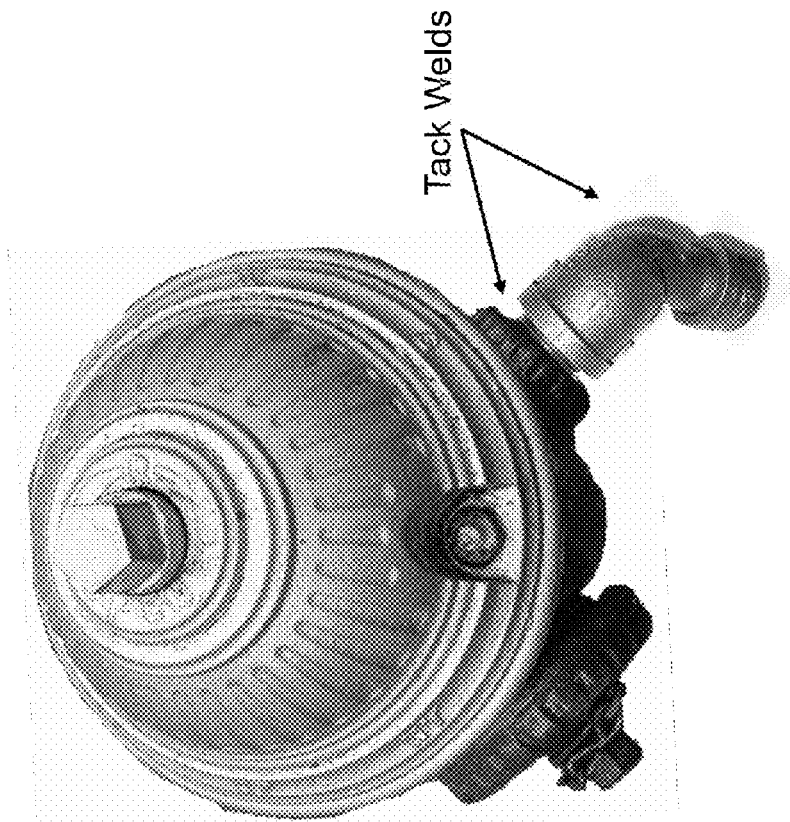
FIG. 27 is a top view of the exemplary retrofitted fire hydrant of FIG. 26.
Figure 28:
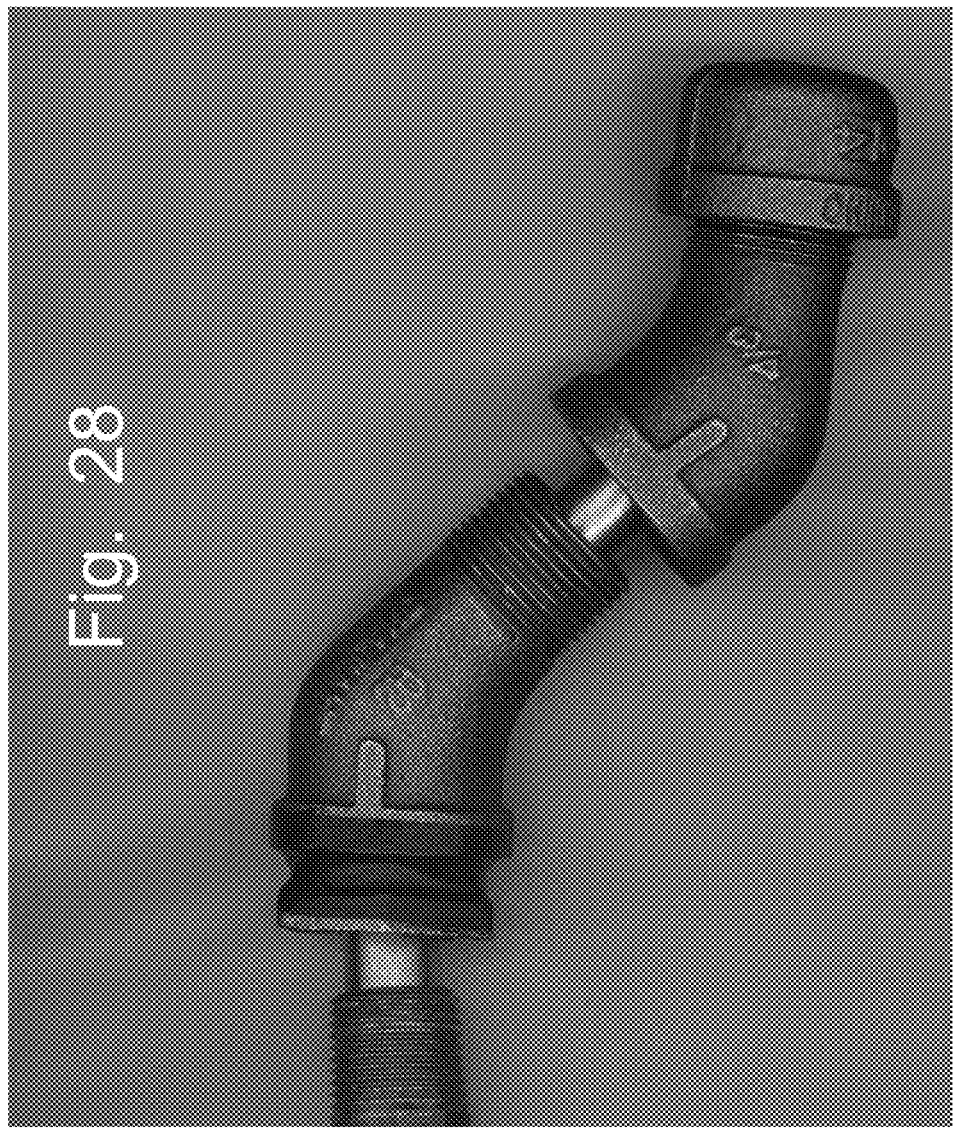
FIG. 28 depicts a expanded side view of an exemplary dual BFP fire hydrant retrofit according to an exemplary embodiment of the present invention.
Figure 29:
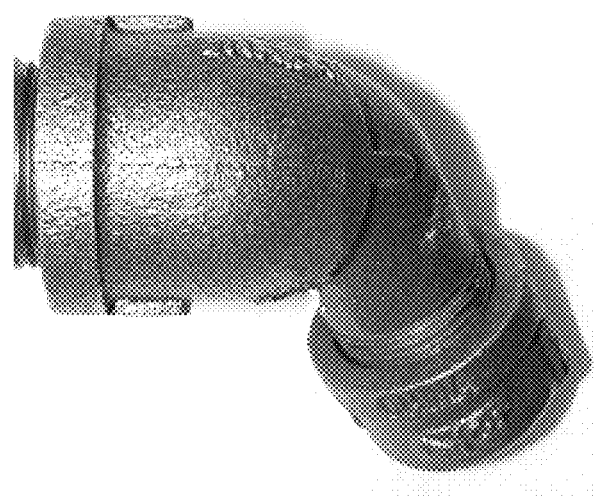
FIG. 29 is a detailed top view of the retrofit assembly depicted in FIG. 27.
Figure 30:
FIG. 30 is a front view of the exemplary hydrant retrofit assembly of FIG. 29.
Figure 31:
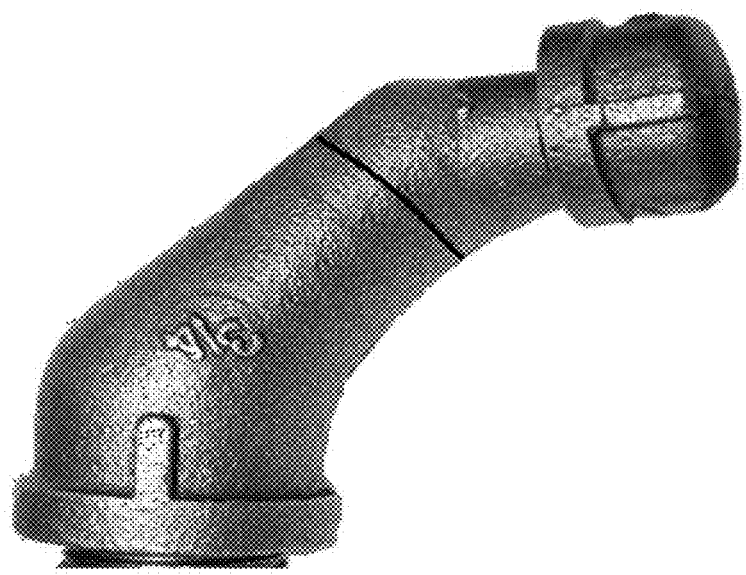
FIG. 31 is a side view of the exemplary hydrant retrofit assembly of FIGS. 29 and 30.
Figure 32:
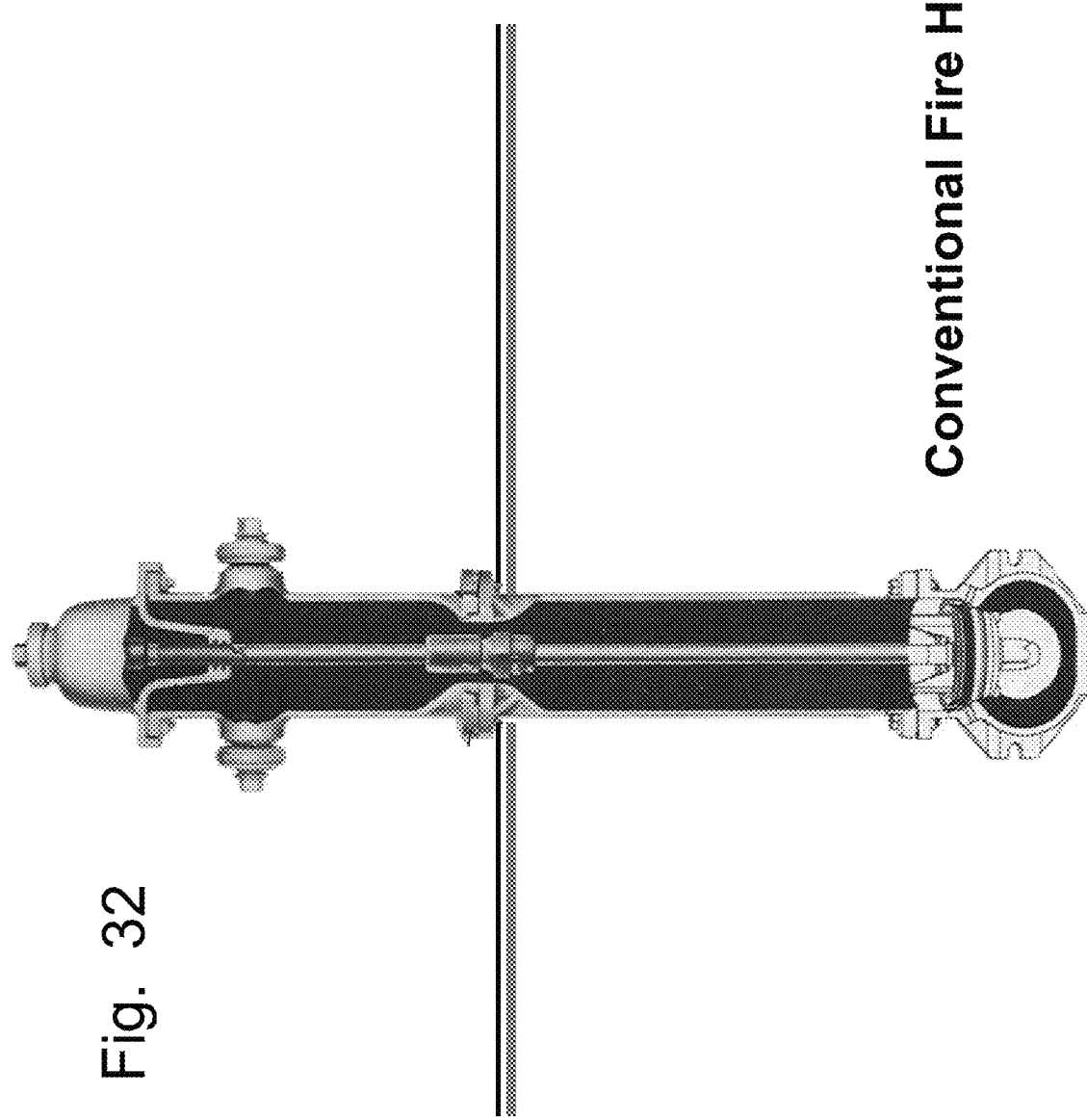
FIG. 32 illustrates an exemplary conventional fire hydrant.

Thus, FIG. 24 depicts a side view of an exemplary fully assembled BFP, and FIG. 25 illustrates such a BFP in an expanded view, showing the two portions of the housing 30 and the check ball 5, as well as a washer on the proximal side of a distal flange. These views accurately show the mechanical and physical simplicity of the BFP, a springless caged ball check valve that be easily inserted into a pipe or copper tube and having only one moving element.

Figure 13:
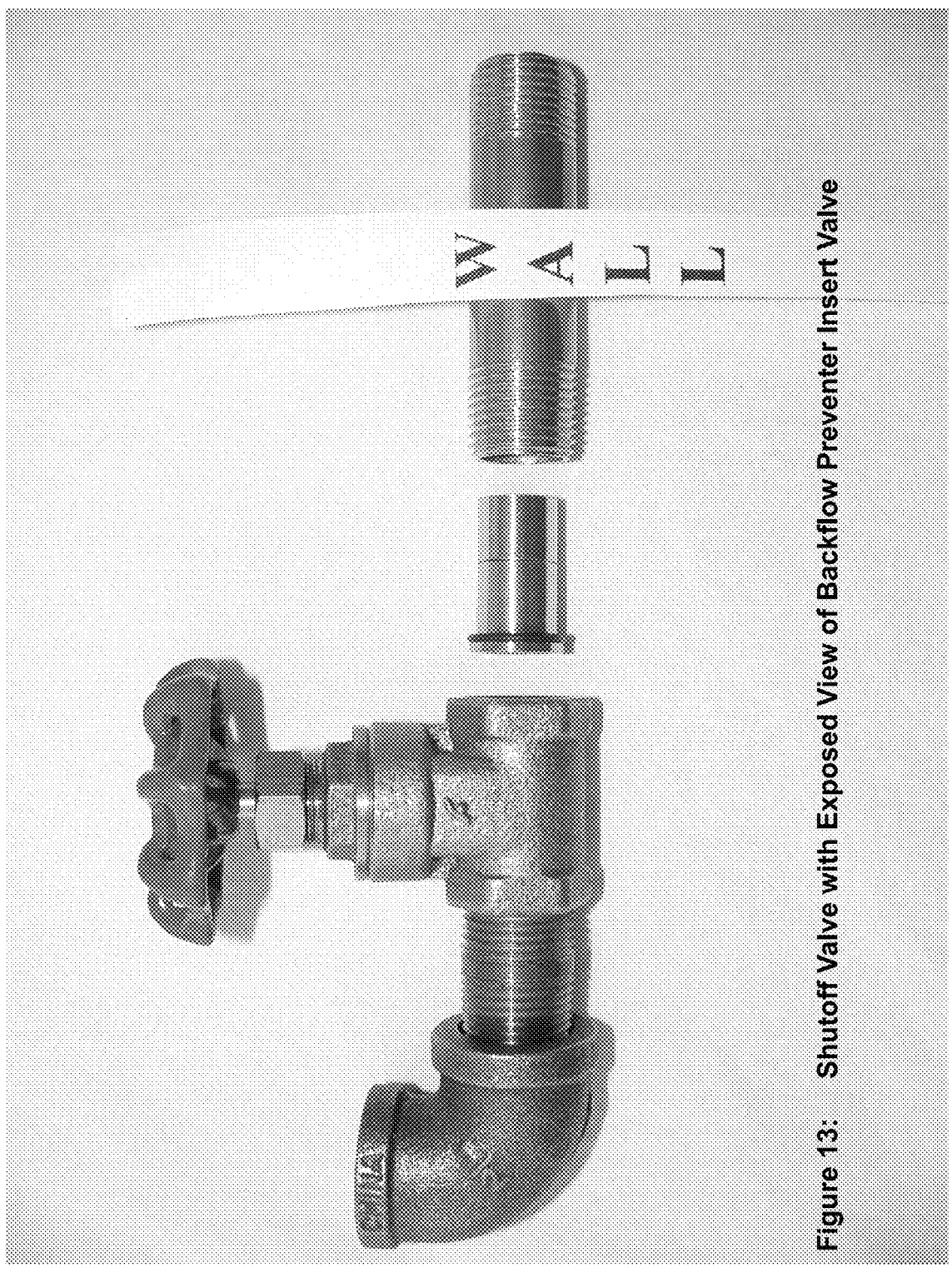
FIG. 13 shows the setup of FIG. 12 with a BFP according to an exemplary embodiment of the present invention.
Figure 14:
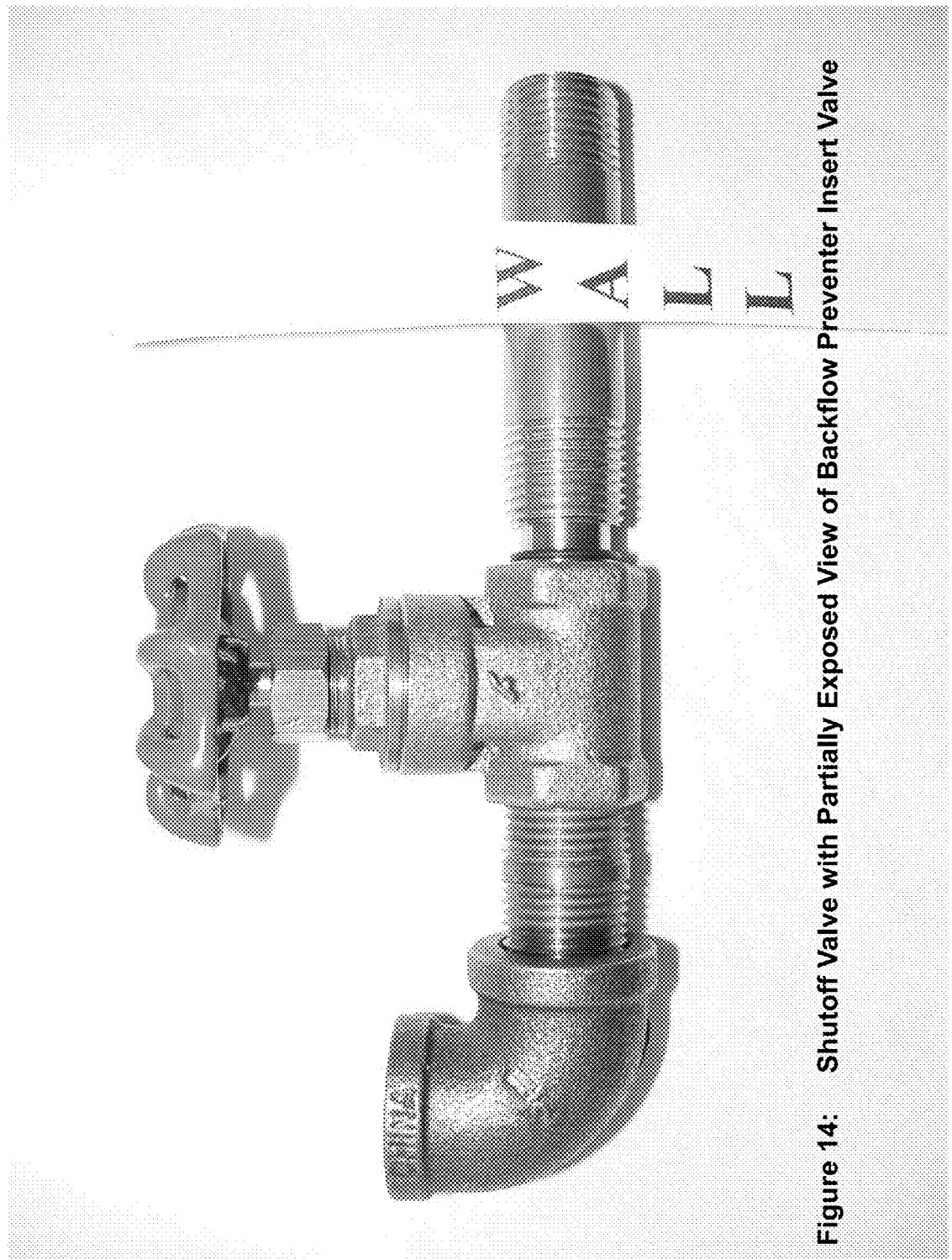
FIG. 14 depicts the setup of FIG. 13 with the BFP partially exposed.
Figure 15:
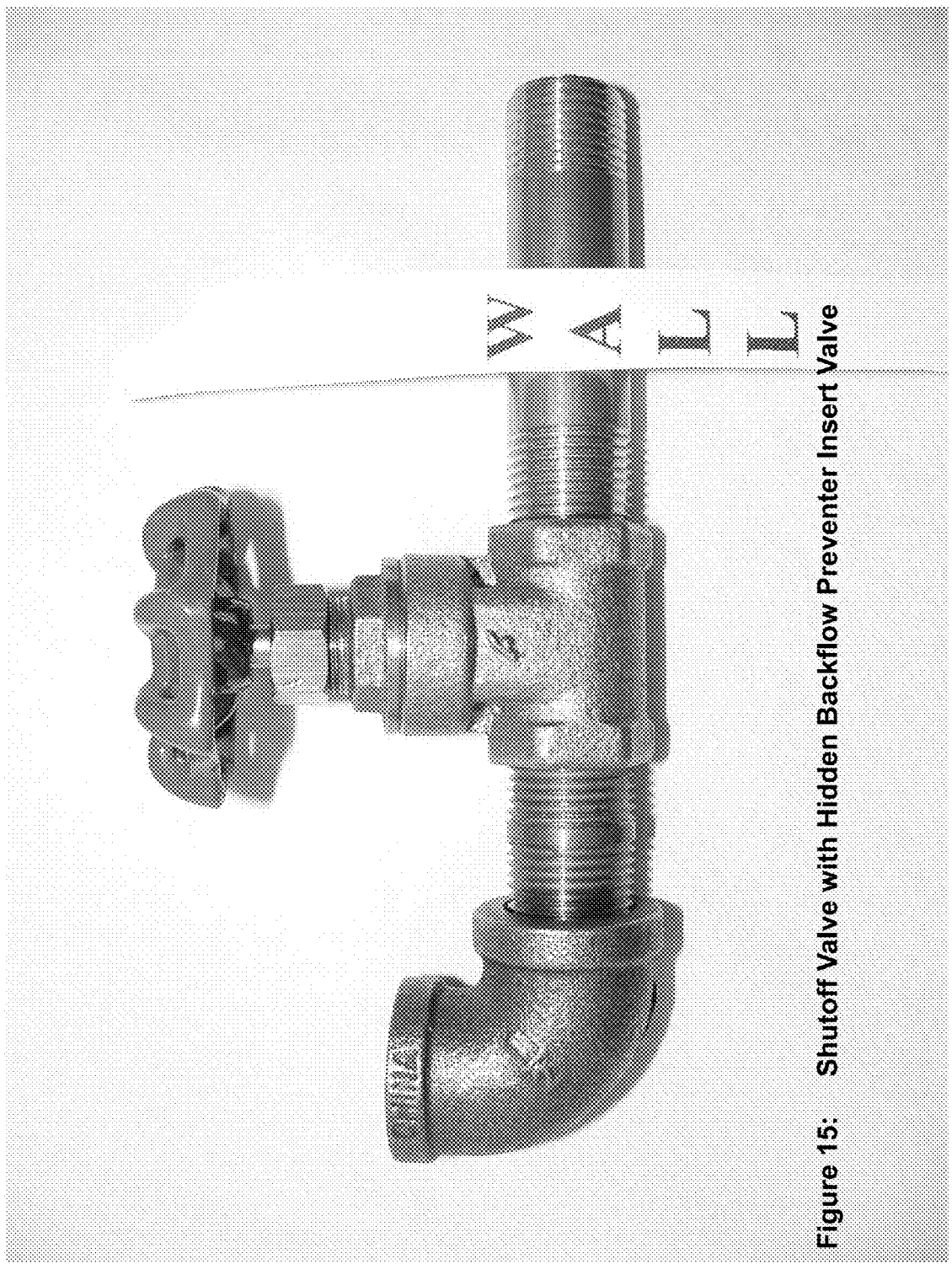
FIG. 15 depicts the setup of FIGS. 13 and 14 as it would appear after installation.

FIGS. 13 and 14 depict an exemplary BFP, similar to that of FIGS. 24 and 25, being installed on the supply side of such a shut-off valve. The BFP can be installed, as shown, by opening the connection between the shut-off valve and the supply line. FIG. 15 depicts the same BFP as fully installed, and thus invisible from the outside.

Returning to FIG. 1, on the distal end of the BFP can be seen flange 50 and washer 10, which can, for example, easily fix, seal and position the BFP within pipe 20 and a shutoff valve, where the thickness of flange 50 is sufficiently small so as to allow a complete connection between the pipe and the upstream end fitting of the shutoff valve or other connection, as the case may be. As shown, for example, in FIGS. 13-15, the outside diameter of the flange, washer and exposed edge of the NPS pipe can be essentially equal, providing means for the shutoff valve to be easily reconnected onto the exposed pipe end, rendering the BFP invisible and tamperproof when the line is again pressurized.

Also, with reference to FIG. 1, there is seen orifice 70, ball seat 45 and retaining screen 15. Under normal forward flow ball 5 is pushed against the inside (proximal side) of retaining screen 15, which is designed such that a fluid can flow easily and freely through transition cone 60, orifice 70, then around and past the smooth outer surface of seated ball 5 and through annulus 40, which is a space, or set of portholes, in retaining screen 15 allowing outward flow between the exterior of seated ball 5 and the interior wall of housing 30. Details of retaining screen 15 are described in connection with FIG. 3 below.

FIG. 2 depicts a cross-sectional view of the exemplary BFP of FIG. 1 subjected to a flow reversal, or backflow condition. In such a circumstance, where the fluid flow reverses direction, ball 5 is hydraulically and instantly forced off the interior of retaining screen 15 and seated on annulus 45 (also referred to sometimes herein as "check valve seat"), thus occluding orifice 70. It is this functionality which only allows fluid flow in the forward direction, and thus prevents backward flow, thus precluding the introduction of contaminants upstream into the water supply lines. When the direction of flow again changes and thus returns to normal (the situation of FIG. 1) fluid dynamics will force the ball back to reposition itself on the interior of retaining screen 15.

FIG. 3 depicts an end view (i.e., from the downsteam side, or the far left of FIGS. 1-2 looking rightward into the BFP from its exterior) of the retaining screen of the BFP assembly. Retaining screen 15 keeps ball 5 (not shown) operational at all times by providing means for the ball to instantly respond to the fluid dynamics of a given condition, i.e., normal or reverse flow, regardless of existing differential pressures or rate of flow.

Figure 16:
FIG. 16 depicts a rear-end view of a BFP according to an exemplary embodiment of the present invention.

Thus, in exemplary embodiments of the present invention, during normal flow, hydraulic conditions will force ball 5 (also sometimes referred to as a "check ball") to instantly position itself on the mated concave surface of the tapered/ flat radial spokes 25, and axial hub/seat 65, and stay there, regardless of the physical orientation of the insertable backflow preventer assembly, i.e., vertical or horizontal, or the flow rate, since the ball has a specific weight close or equal to the fluid. Any fluid can, for example, flow with relative ease around the ball, through the three downstream portholes 55 formed by the three radial spokes 25. The retaining screen with the tapered (streamlined edge) spokes 25, center flushing hole 35 and portholes 55 also provide means for an exemplary ball to be instantly displaced and hydraulically forced off hub/seat 65 when the flow reverses, regardless of the reverse (backflow) rate of flow. Such functionality allows for immediate seating of the ball even under very low flow conditions, such as where the backflow pressure differential is very low, as might be applied in an attempt to defeat a conventional check valve. FIG. 16 is a similar view to that of Hg. 3 or an exemplary BFP. In the exemplary BFP of FIG. 16, tapered spokes 25 have been tapered on both ends, and their outward edges shaved for lesser impedance of forward flow.

Figure 18:
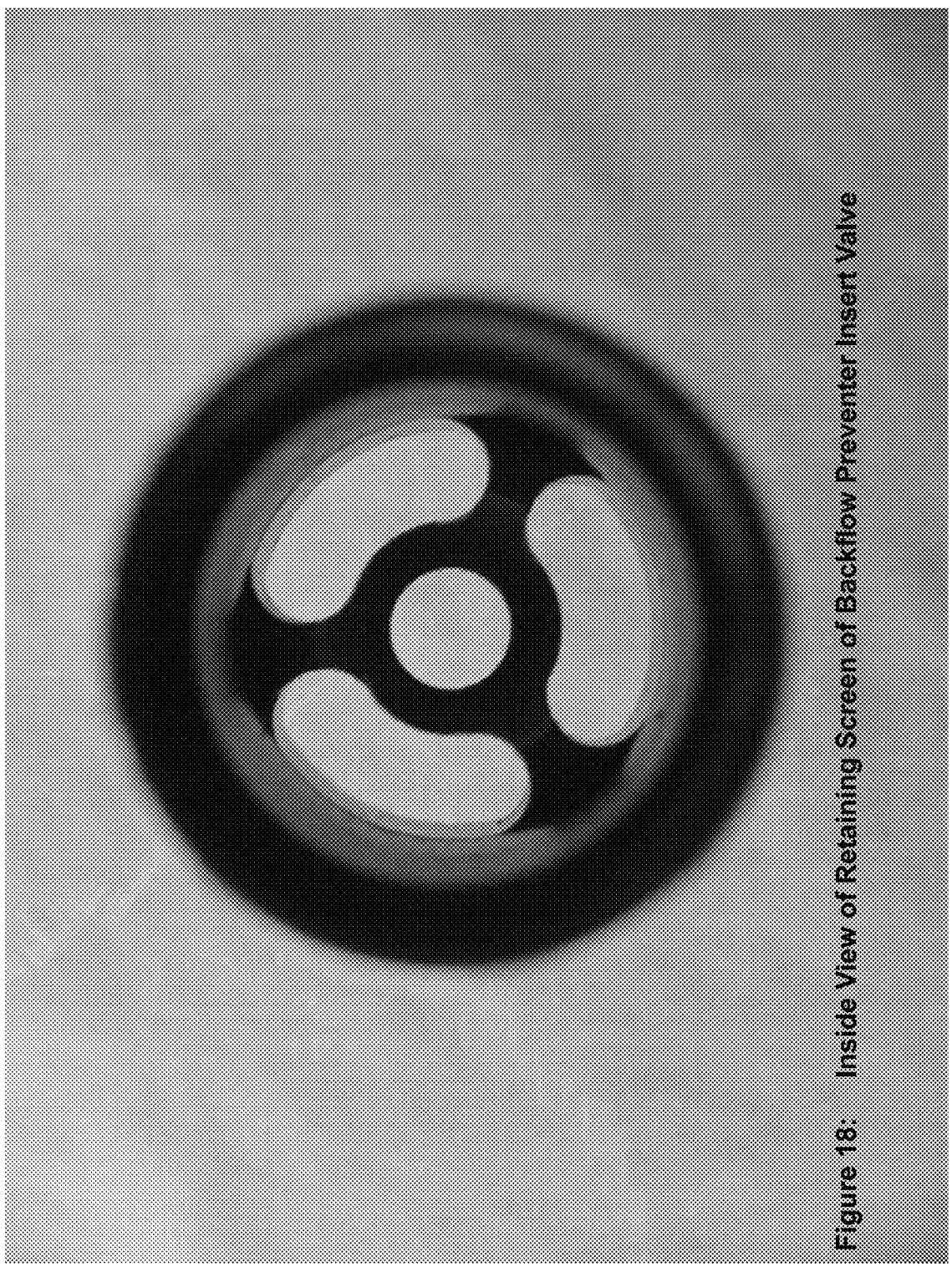
FIG. 18 depicts the view of FIG. 17 without the check ball.
Figure 19:
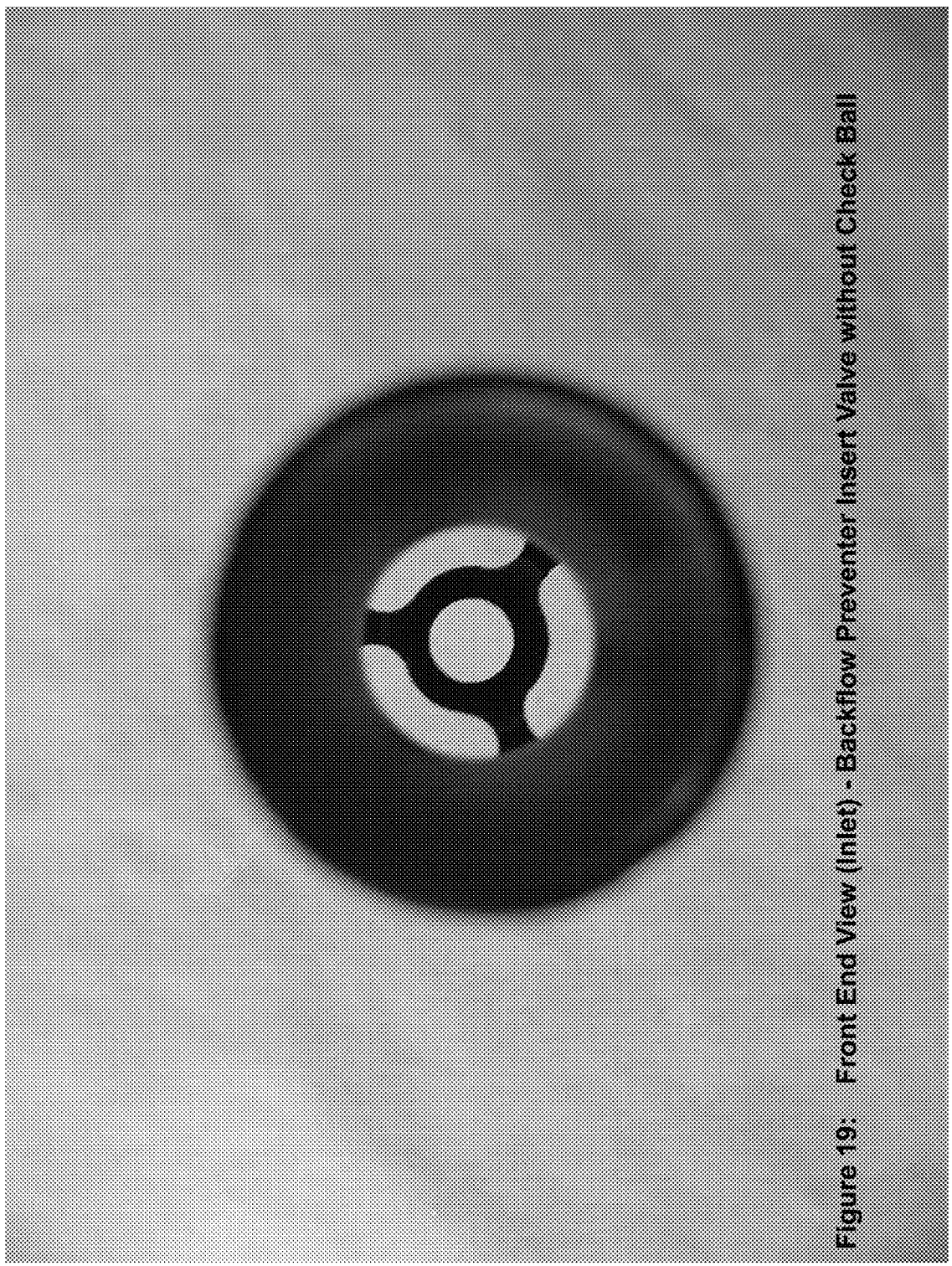
FIG. 19 depicts the retaining screen of FIGS. 17 and 18 and the ball cage of an exemplary BFP according to an exemplary embodiment according to the present invention.

FIGS. 18 and 19 show an exemplary BFP retaining screen from an upstream view (i.e., from the right in FIGS. 1 and 2 looking leftward into the BFP). FIG. 18 shows a close up view and FIG. 19 a more distanced view, which shows the portion of the interior of housing 30 in which the ball is contained (i.e., between seat 45 and retaining screen 15, although seat 45 is not shown in FIGS. 18-19).

Figure 17:
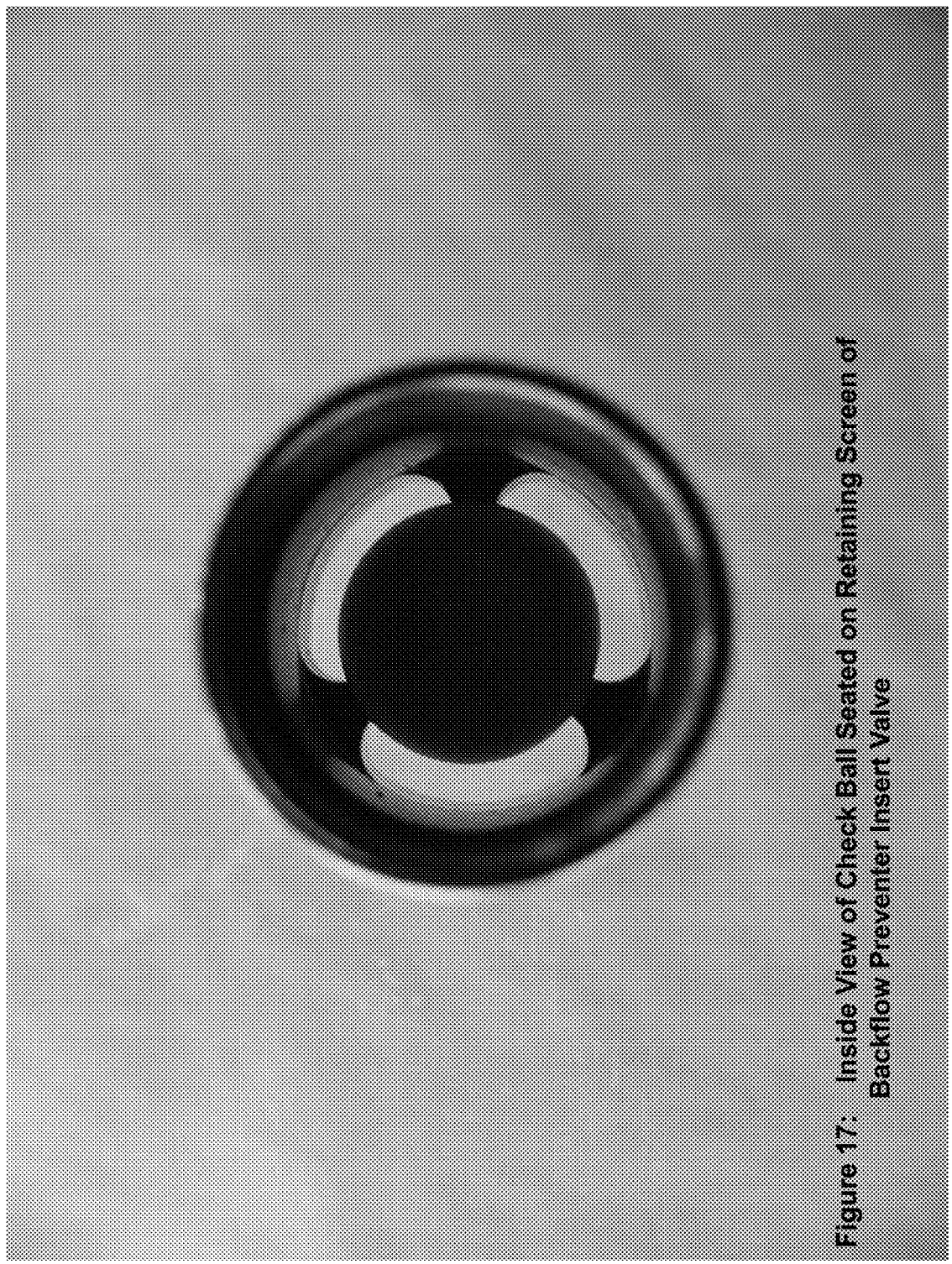
FIG. 17 depicts a close front-end view of a seated check ball of an exemplary BFP according to an exemplary embodiment of the present invention.
Figure 20:
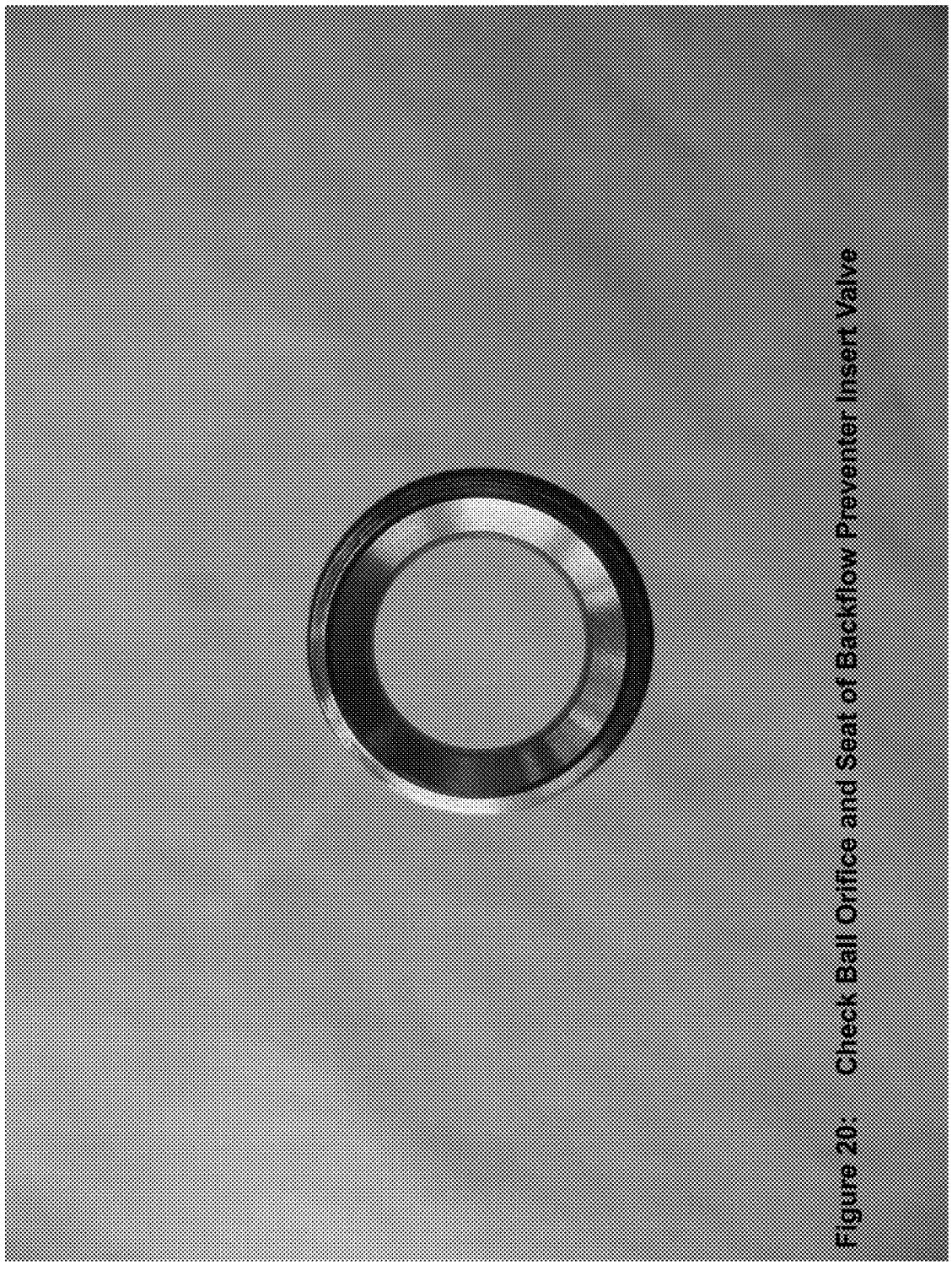
FIG. 20 depicts the check ball orifice and seat of an exemplary BFP according to an exemplary embodiment of the present invention.
Figure 21:
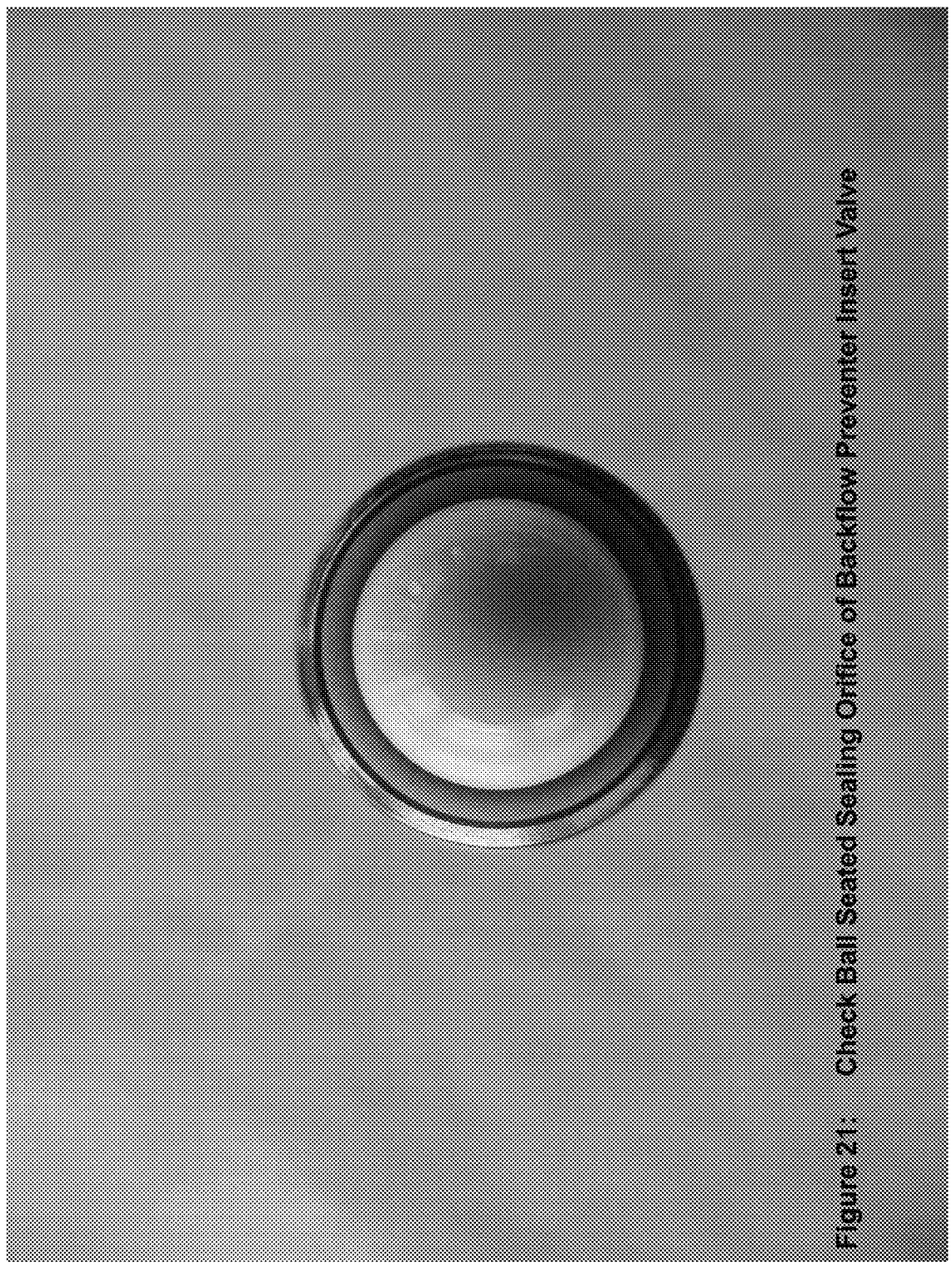
FIG. 21 depicts the orifice and seat of FIG. 20 with a check ball properly seated therein.
Figure 22:
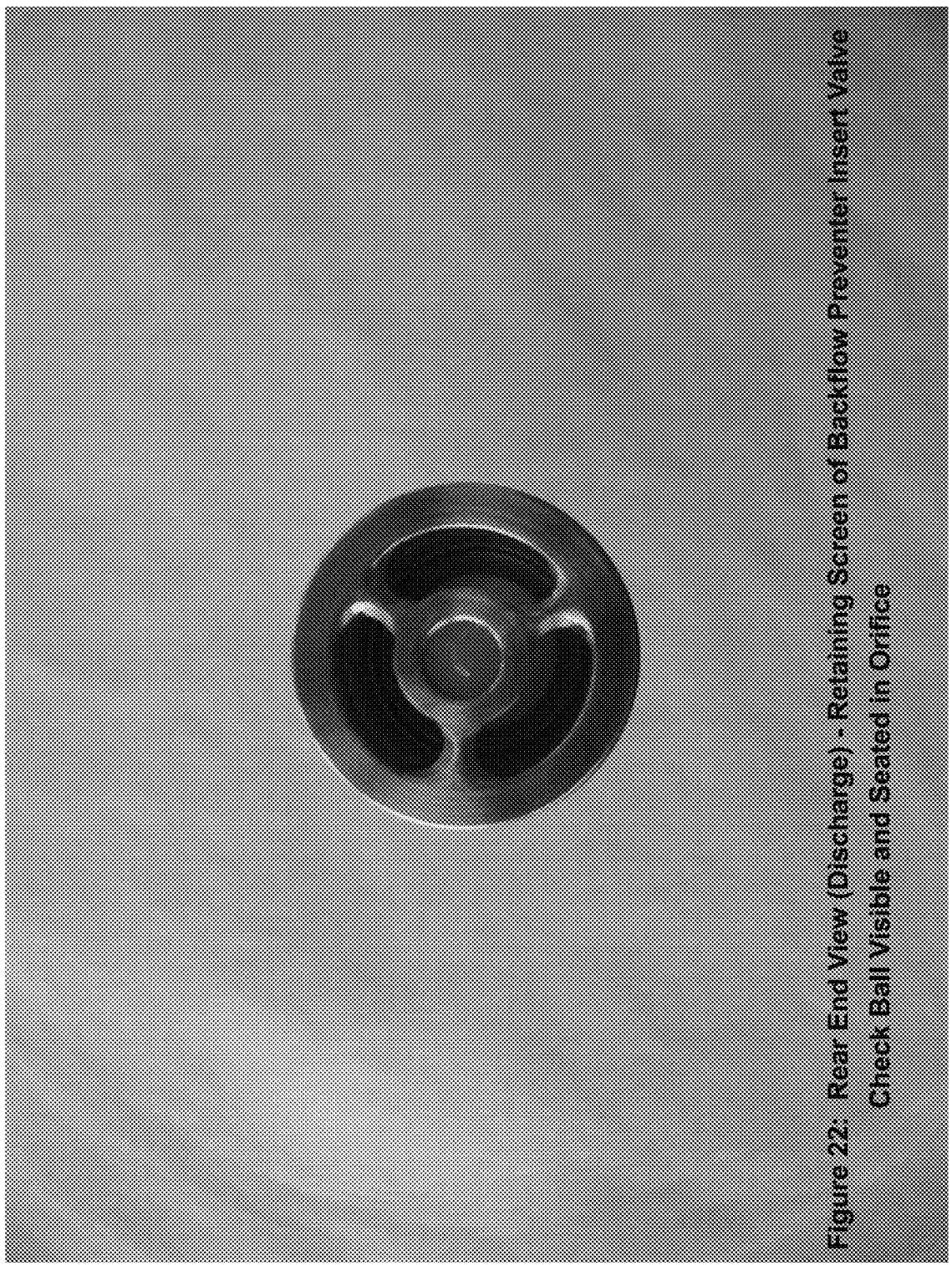
FIG. 22 depicts a rear-end view (similar to that of FIG. 16) of an exemplary BFP with a check ball seated in its orifice as shown in FIG. 21.
Figure 23:
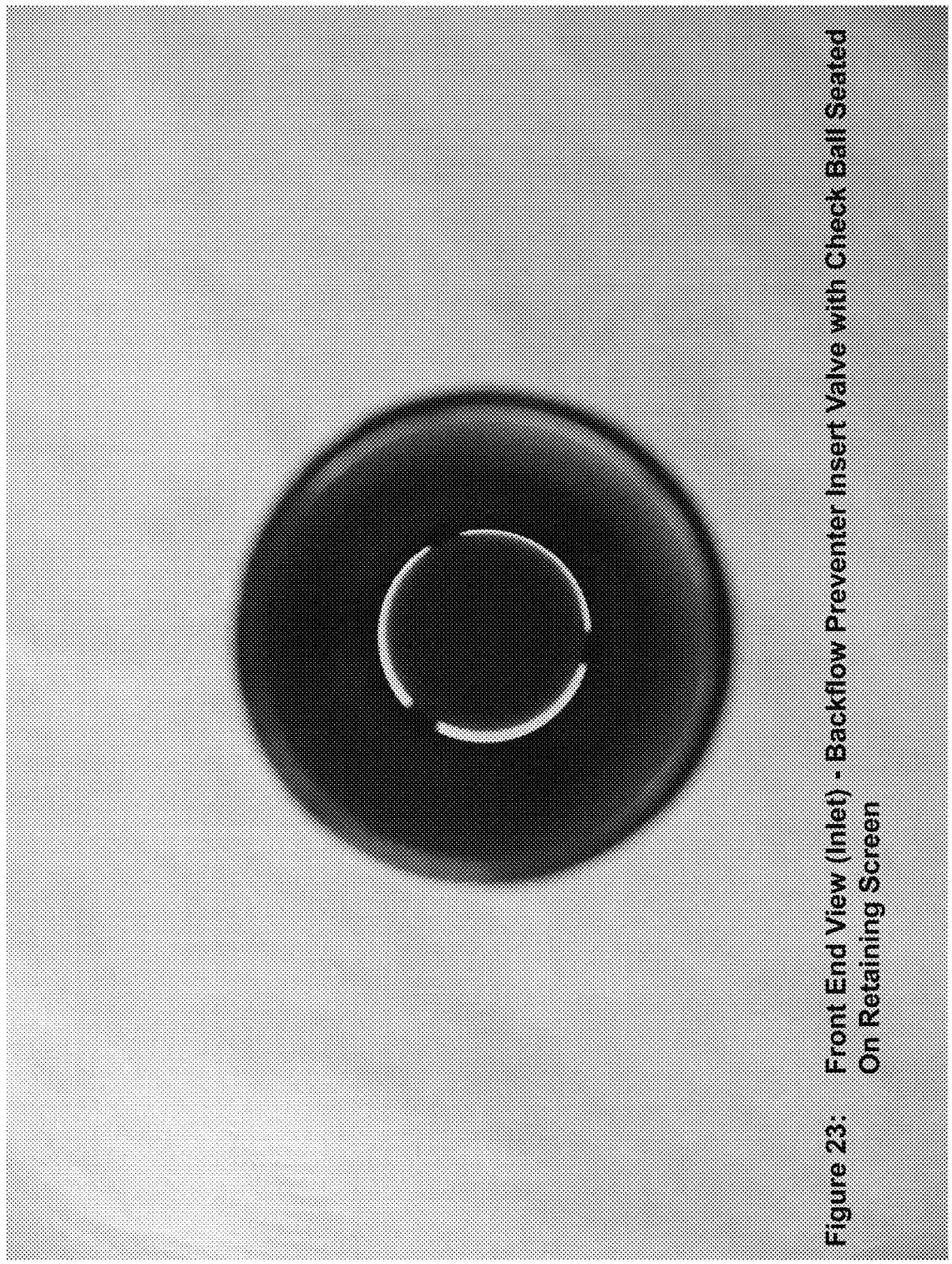
FIG. 23 depicts the front-end view of FIG. 19 with a check ball seated on the retaining screen (forward flow)

FIGS. 17 and 22-23 depict the exemplary BFP of FIGS. 16-25 with the ball seated on the interior of retaining screen 15, as shown in FIG. 1. FIG. 17 shows an inside view, similar to that of FIG. 18, yet here the ball is also shown, and FIG. 23 shows a more distanced view, similar to that of FIG. 19, albeit with the ball shown. FIG. 22 shows the same ball-retaining screen configuration looking from the outside of the BFP from a distal viewpoint, looking through the BFP, a similar viewpoint as is shown in FIG. 16.

FIGS. 20 and 21 are details of the ball seat 45 and orifice 70 of an exemplary BFP, without and with a seated check ball 5, respectively.

FIG. 4 is a graphical illustration showing the operational features and configuration of the external and internal components of the insertable backflow preventer including the housing 30, flange 50, ball 5, transition zone 60, orifice 70, check valve seat 45, tapered edge radial spokes 25, flushing hole 35, port holes 55, ball hub/seat 65 and retaining screen 15 design when subjected to hydraulic conditions characterized as normal and reverse flows. Thus, in the top panel of FIG. 4 a forward flow condition is depicted, and in the bottom panel of FIG. 4 a backflow condition, where no flow exists to the right of the ball seated in the check valve seat 45. FIG. 4 also shows the OD or Outer Diameter of the valve body or housing 30. As shown, the OD is constant between the distal end (left side, shown in white) and the proximal end (right side, shown in black) of said valve body (housing 30).

As can be seen from the perspective rendering of the exemplary retaining screen in FIG. 4 (second drawing from the top on left side of drawing), the tapered spokes can be grooved on their interior side (the side that the ball contacts) so as to guide the fluid down them and providing for a thin film of fluid between the seated ball and the hub/seat in a forward flow condition. This allows the ball to rotate randomly while seated and provides a self-cleaning action thus keeping the ball free of deposits or build-up.

FIG. 5 depicts a three dimensional view of an exemplary BFP inserted in a pipe; here normal forward flow is upwards and to the right in the figure.

FIGS. 6(a)-(c) respectively depict three pairs of force diagrams that illustrate three different response scenarios of an exemplary BFP when such exemplary valve is horizontal, inserted in a pipe 20, and subjected to very small normal and reverse flows. FIG. 6(a) illustrates what occurs when the specific weight of ball 5 is significantly less than that of the surrounding fluid, FIG. 6(b) illustrates the scenario when the specific weight of the ball is significantly greater than that of the surrounding fluid, and FIG. 6(c) illustrates that when the specific weight of the ball equals (or substantially equals) the specific weight of the fluid. In FIG. 6, F1 is a buoyancy force, F2 is the force of gravity acting on the ball, F3 is fluid pressure, F4 is surface friction opposing fluid pressure, and F5 is the reactive push downward of housing 30 on a ball compressed up against it.

Thus, with reference to FIG. 6, each pair of diagrams show the caged ball with different specific weight relative to the surrounding fluid. Each pair of figures illustrate the fluid dynamics and performance characteristics of the caged ball, which is designed to move freely, i.e., laterally and longitudinally, in the surrounding fluid inside the valve housing and chamber. FIG. 6(a) illustrates the caged ball's performance when the flow rate is very low, and, the specific weight of the ball is substantially less than the specific weight of the fluid immersed therein, creating underflow. Said condition can result in a valve's inability to prevent backflow. FIG. 6(b) illustrates a freely suspended caged ball's performance when the flow rate is very low, and the specific weight of the ball is substantially greater than the specific weight of the surrounding fluid, resulting in an overflow condition when the ball is subjected to normal or in reverse flow. Again, this condition can also compromise a valve's ability to prevent backflow.

The third pair of force diagrams, FIG. 6(c), show the fluid dynamics and performance characteristics of the caged ball designed in the fluid, each having substantially equal specific weights, eliminating any possibility of having an underflow or overflow condition and associated backflow preventer insert valve failure. The situation of FIG. 6(c) can be used in exemplary embodiments of the present invention where one BFP is provided, thus insuring operation under the entire gamut of flow rates. It is noted that where system pressure is relatively high, an attempted compromise of the water system via a backflow introduction of a noxious substance would often operate under a small net backpressure, it being difficult to generate a large backpressure against an already large forward pressure of, say 70 psi, and still remain undetected.

Gravitational effects are essentially non-existent in the circumstance of FIG. 6(c), where the ball's specific weight is equal to the specific weight of the surrounding fluid. Therefore, the ball's position within the check valve can be governed entirely by the direction and velocity of the flow, the surface area of the suspended ball, friction, fluid viscosity, and thus the force associated with the flowing fluid.

However, it is possible that a contaminant introduced into a fluid, for example, could theoretically change the specific weight of the fluid, depending on the chemical properties of the contaminant and those of the fluid+contaminant solution. Thus, in exemplary embodiments of the present invention, two or more BFPs could be provided in series (as an integrated device with only one flange at the distal end of the most distal BFP stage, or at two closely separated points using two individual BFPs), each BFP having a ball with a different specific weight, designed, respectively, to be substantially equal to that of the surrounding fluid in the presence of various solutes and to that of the fluid itself under normal conditions, thus insuring backflow prevention across a range of fluid specific weights, even under low differential backpressures. Such a multi-stage BFP apparatus could also be used in fluid systems where different fluids are sent through at different times.

Thus, in exemplary embodiments of the present invention, a BFP can prevent fluid backflow from the valve's fluid outlet to the valve's fluid inlet when the pressure at the fluid inlet is less than the pressure at the downstream fluid outlet. As long as the fluid pressure—the normal flow condition—is greater at the BFP's fluid inlet (upstream) end relative to that at the valve's fluid outlet (downstream) end, the ball will position itself near the retaining screen's concave axial hub 65 (with reference to FIGS. 4 and 17, 22-23). Tests have confirmed that ball 5 does not generally make total compressive contact with the concave surface of the axial hub 65, but, rather, remains in suspension when flow rates exceeded 2-3 gallons per minute.

In such a situation, as shown, for example, in FIG. 6(c) and FIG. 1, the ball can remain in compressive contact with a fluid layer flowing along the concave surface of hub/seat 65 (and through hole 35) at the center of retaining screen 15. Such a layer of fluid can be generated by the three radial spokes 25 and axial hub/seat 65 that form retaining screen 15, all having a concave upstream surface, said radial spokes and hub having a flat leading edge that provides means for the three radial spokes to intercept and redirect a fraction of the fluid flowing during normal flow towards the central axial hub and the hole therethrough.

FIG. 7 is a plot of head loss across an exemplary BFP as inserted in a ½ inch thermoplastic test pipe, subjected to hydraulic pressures between 50-60 psi, and, a relatively high rate of flow approaching 3 gallons per minute, using check balls made of different materials with differing specific weights. Materials tested included polypropylene with a specific weight of 0.91, polycarbonate at 1.21, Delrin® at 1.42, ceramic at 4.2, and high impact polystyrene 1.03. These observations clearly show a minimal impact of a BFP on water pressure.

The caged ball assumes a new position on the concave axial/ball seat 65 of retaining screen 15 each time flow ceases and normal flow is resumed, or on the check valve's orifice/seat annulus 45 when the check valve is subjected to a flow reversal. This operational characteristic can insure, for example, continuous self-cleaning action of the ball since the ball 5 automatically positions itself differently on the concave seat/hub 65 of the retaining screen 15 each time the flow cycles on and off, exposing a different part of the caged ball's outer surface to the scouring velocity of the flowing fluid.

As noted, in exemplary embodiments of the present invention the backflow preventer valve performs flawlessly when ball materials have a specific weight substantially equal to the specific weight of the surrounding fluid, even when subjected to very low flow reversals (backflow) flow rates, e.g., less than 1 liter/minute, or differential pressures less than 1 psi. The specific weights of exemplary balls tested ranged from a 0.93 for Low Density Polyethylene (LDPE) to 1.41 for Delrin®, polycarbonate and High Impact Polystyrene (HIPS) having a specific weight of 1.03. Very low flows were measured volumetrically.

As noted, in the event the pressure at the valve's fluid inlet (upstream) becomes less than the fluid pressure at the valve's fluid outlet, ball 5 can, for example, automatically unseat from the mated concave shaped axial seat hub 65 located on the retaining screen 15, and then be forced by the pressure gradient of the fluid against annulus 45, thus shutting off orifice 70 and preventing any substantial liquid backflow through the valve.

Figure 8:
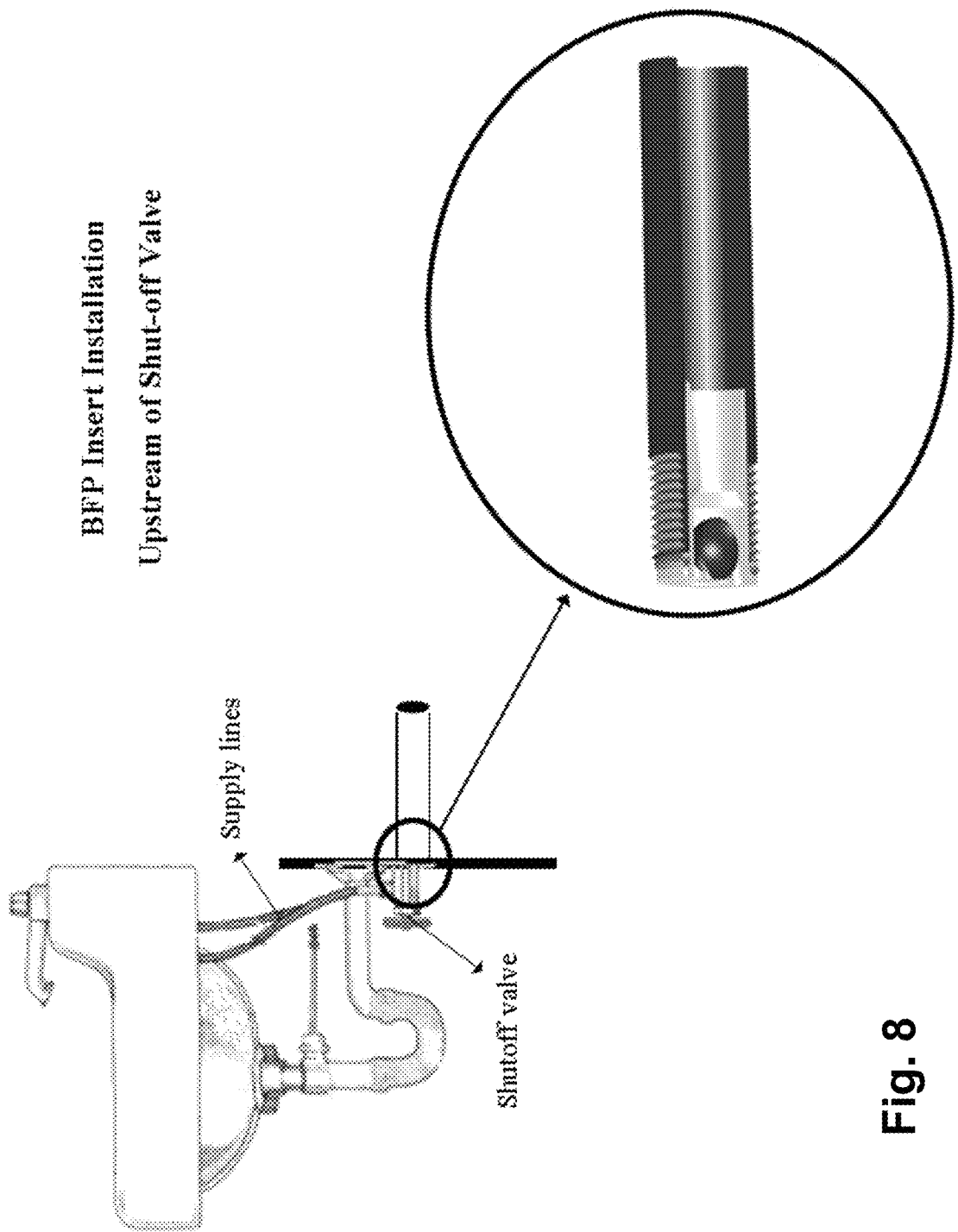
FIG. 8 illustrates an exemplary BFP installation for a sink according to an exemplary embodiment of the present invention.
Figure 9:
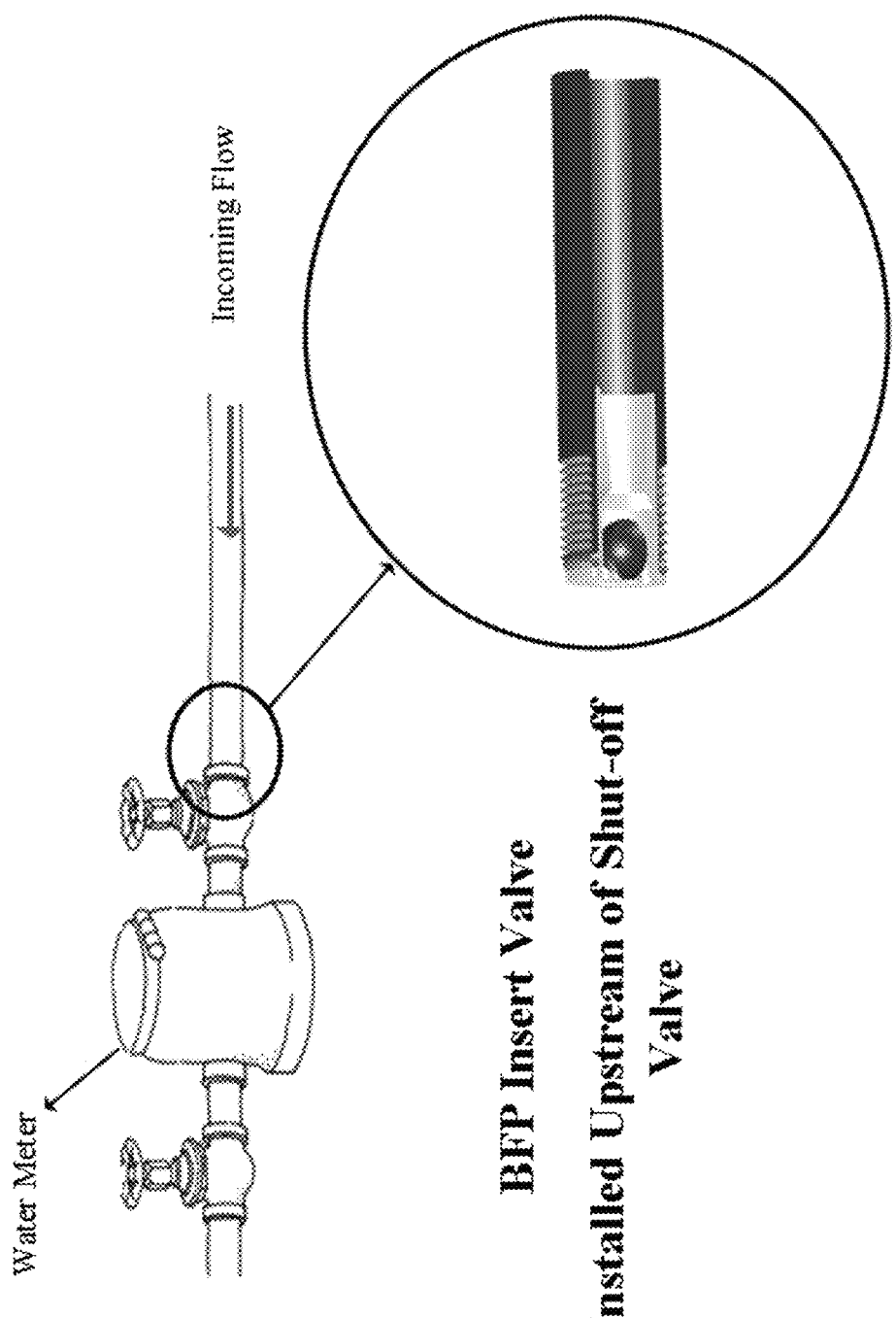
FIG. 9 illustrates an exemplary BFP installation upstream of a shutoff valve on the utility's side of a water meter according to an exemplary embodiment of the present invention.
Figure 10:
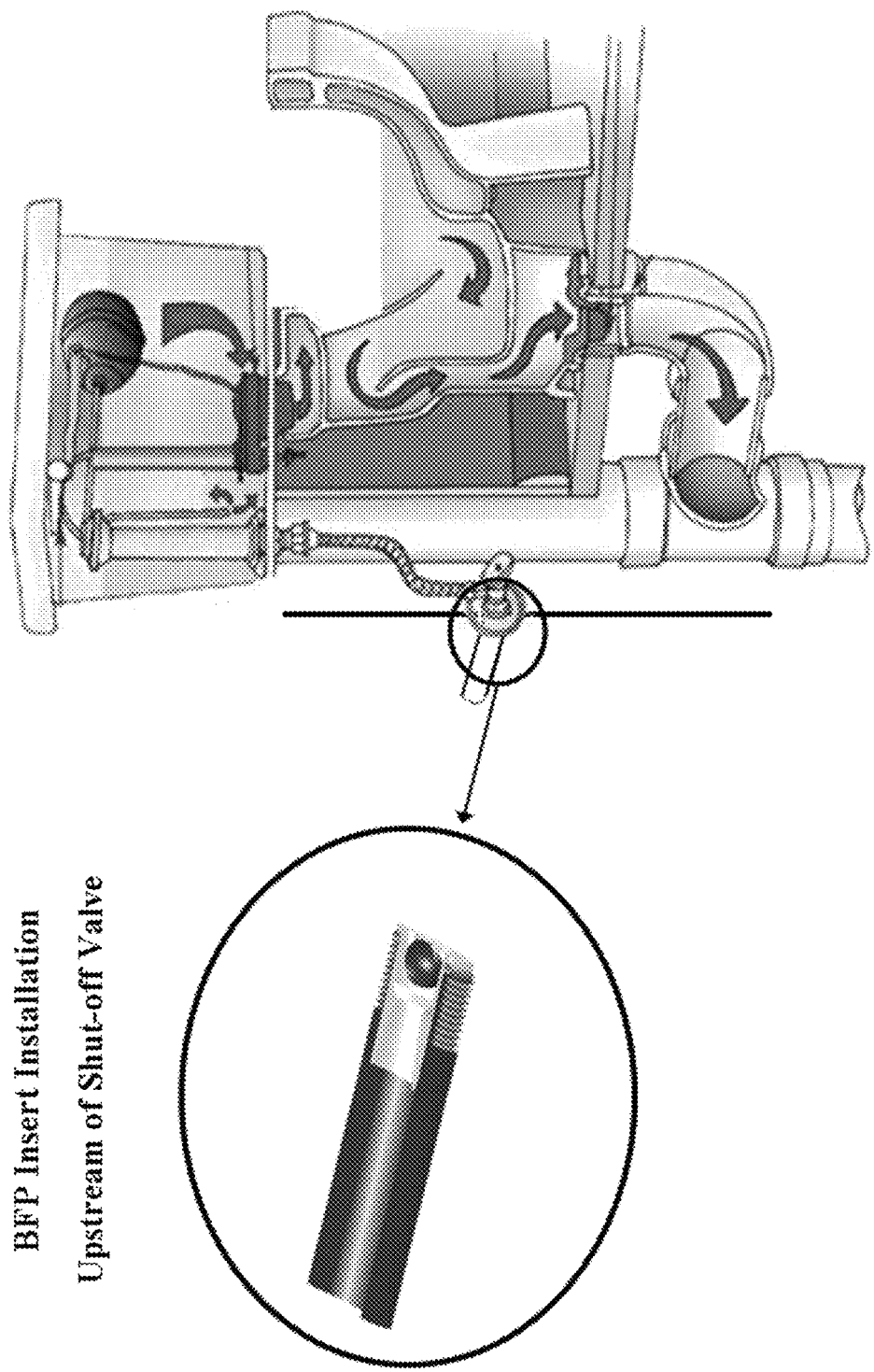
FIG. 10 illustrates an exemplary BFP installation for a toilet according to an exemplary embodiment of the present invention.
Figure 11:
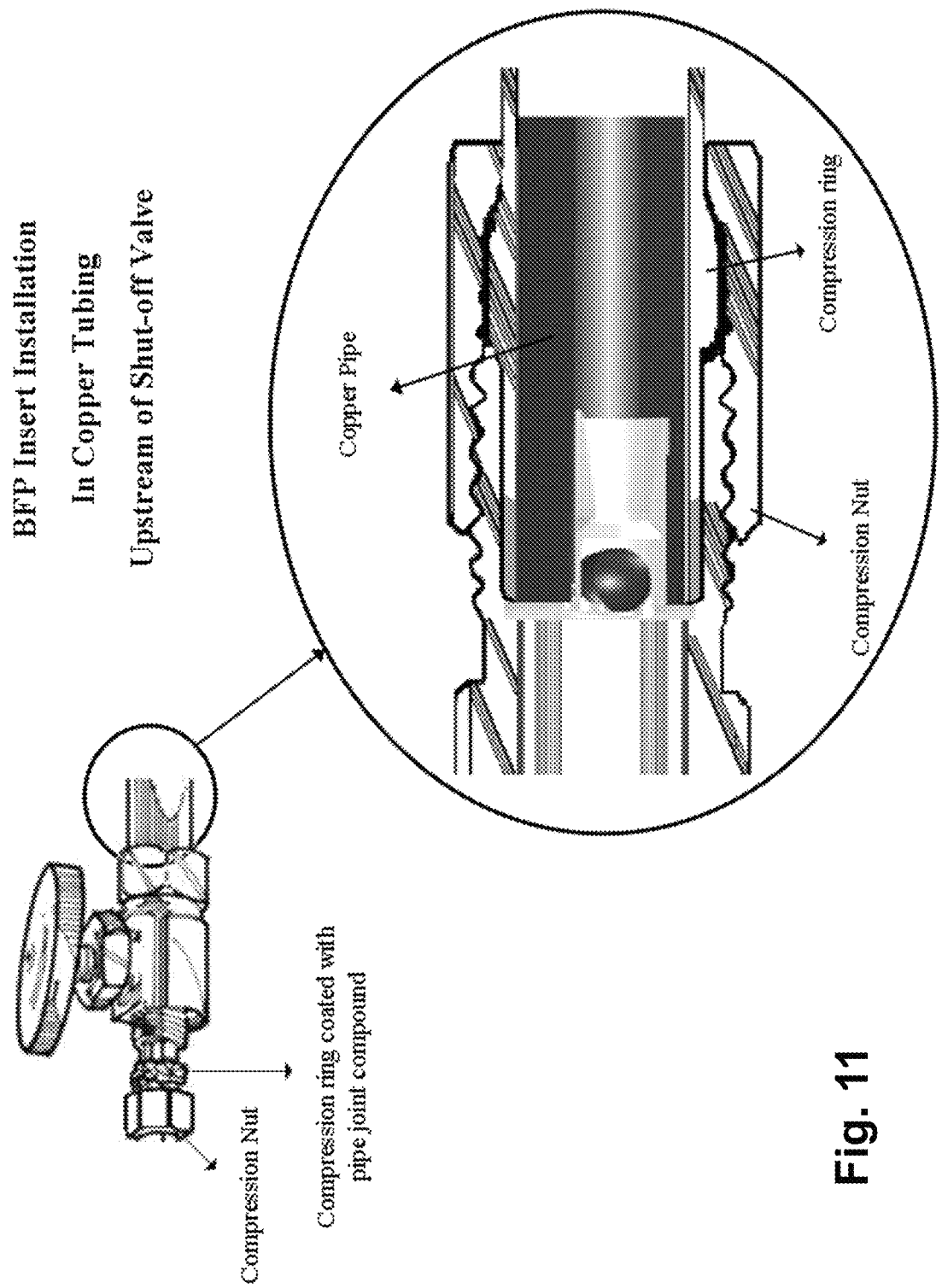
FIG. 11 illustrates an exemplary BFP installation in copper tubing according to an exemplary embodiment of the present invention.
Figure 12:
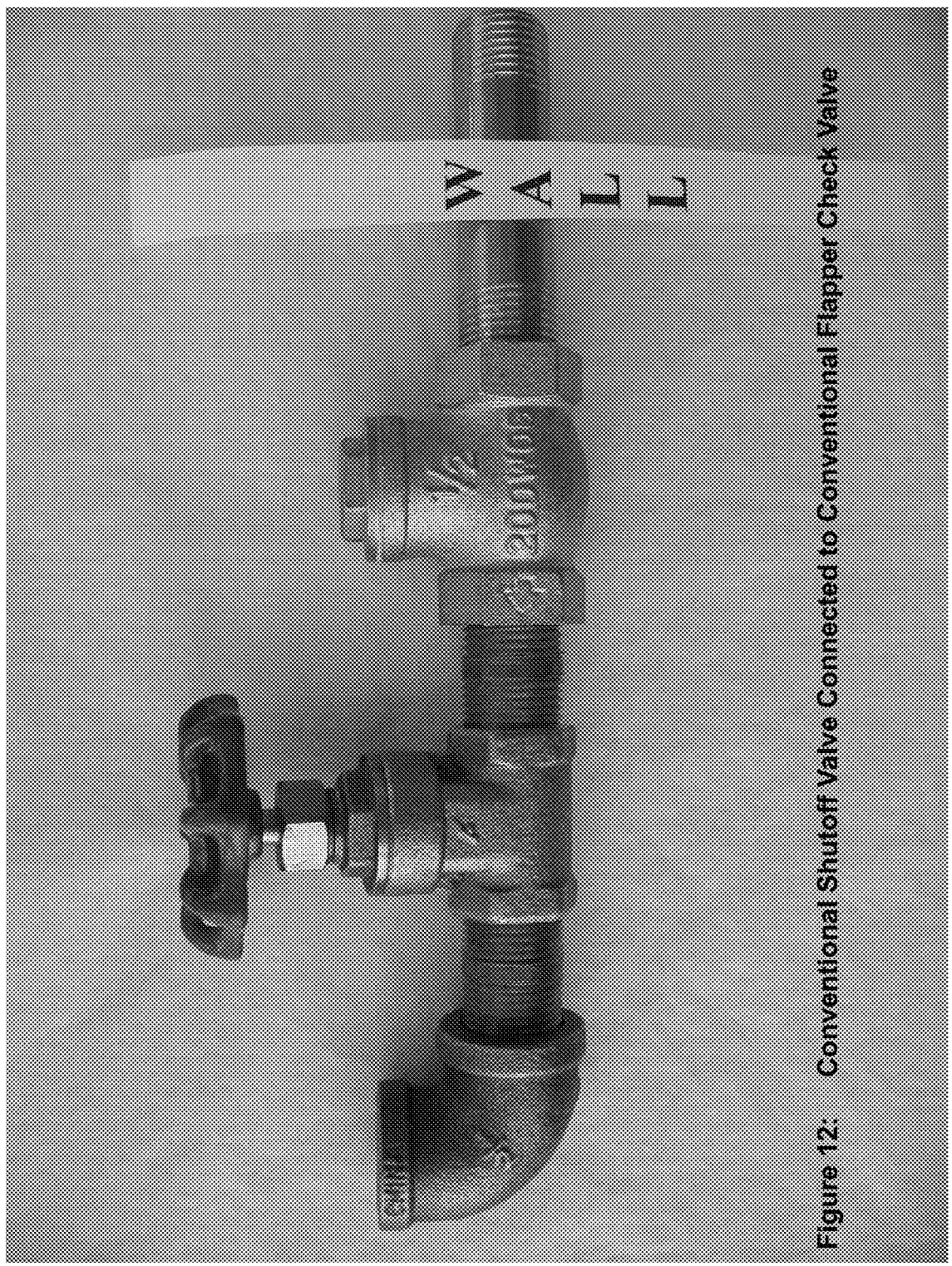
FIG. 12 illustrates depicts a conventional shutoff valve connected to a conventional flapper check valve.

FIGS. 8-11 depict exemplary installations of an exemplary BFP upstream of a fixture's shut-off valve. FIG. 8 is a sink installation, FIG. 9 one on the utility's side of a water meter, FIG. 10 in a wall behind a toilet's supply line, and in FIG. 11 upstream of a generic copper pipe compression fitted shut-off valve.

Recognizing the critical function of a BFP according to the present invention to safely and effectively protect potable water systems from any possibility of accidental or intentional reverse flow contamination, and, to insure safe, essentially flawless and maintenance free operation over a protracted period, selected materials can be identified for an exemplary valve's construction. Such materials can include, for example, 304 Stainless Steel, lead-free brass or other advanced weight polymers deemed safe by appropriate testing organizations (such as, for example, NSF) for the housing. For the ball, for example, hollow 304 stainless steel, porous or hollow ceramics, or special advanced lightweight polymers, such as, for example, Udel® a polysulfone, amorphous high performance thermoplastic that offers excellent mechanical and chemical resistance, can be used. In particular, Polysulfone's properties remain relatively consistent over a broad range of temperatures up to +300° F. (+149° C.), which are important in said application.

Udel® offers hydrolysis resistance for continuous use in hot water and steam at temperatures up to 300° F. It also provides high chemical resistance to acidic and salt solutions, and good resistance to detergents, hot water, and steam. Polysulfones have excellent radiation stability and offer low ionic impurity levels. Food-grade Udel®, a polysulfone, is FDA, NSF, 3A-Dairy and USP Class VI compliant. Other potentially suitable advanced polymers include, for example, PolyEtherEtherKetone (PEEK), HOPE and Radel® 5000/5001. Radel, a PES Polyethersulfone amorphous high performance thermoplastic is NSF 61 certified, possess high heat deflection temperatures properties and has good hydrolytic stability.

In exemplary embodiments of the present invention retaining screen 15 can be formed by three equidistant radial spokes 25, which can, for example, join at a central axial hub 65 and have a concave surface on the (upstream) inward side of the retaining screen. Such exemplary three radial spokes 15 can also, for example, possess two additional important design features: a flat leading edge, and a tapered trailing edge. The latter to insure that freely suspended ball 5 instantly responds to even a very low backflow flow condition. Such a tapered trailing edge can improve the fluid dynamics of the valve by promoting and redirecting the freely suspended ball 5 and forcing it into the seat (annulus) 45 of the check valve when flow, whether large or very small, reverses direction. Additionally, a flat leading edge (i.e., the part of the spoke which contacts the housing being essentially flat, or perpendicular, to the forward flow; a close view of FIGS. 18-19 shows the flat shape of the depicted spokes where they connect the interior of the housing, and then the fact that they are then at an angle less than 90 degrees to the flow direction as they meet the hub/seat 65) of radial tapered spokes 25 revealed a critical interdependent relationship with flushing hole 35 and the configuration of hub/concave seat 65, which clearly enhanced ball stability over a wide range of fluid flow. The flat leading edge provides means for the three tapered radial spokes 25 to intercept and redirect a fraction of the fluid flowing during normal flow, which is perpendicular thereto, towards the central axial hub/seat 65 and through hole 35.

As noted, bench observations confirmed a very slow rotation of an exemplary ball 5, clearly indicating that the ball was not in compressive contact with the retaining screen 15 itself, rather, riding on a very thin film of the surrounding fluid, which was very apparent when the valve was subjected to normal flow rates greater than 2 gpm, creating a self-cleaning feature that is clearly associated with the unique flat-tapered surface design of tapered radial spokes 25.

In exemplary embodiments, since exemplary retaining screen 15 is concave (internally; as shown in FIG. 2) the caged ball mates with the hub/seat 65 of the retaining screen, when the direction of flow is normal.

For reverse flow, seat (annulus) 45 can have, for example, a circular flat surface that is inclined to the longitudinal axis, forming a surface that resembles a truncated cone, or alternately, exemplary ball seat can be, for example, circular and simultaneously have a circumferentially mated seat whose surface is identical to the radius of the ball. If there is no flow the suspended ball 5 moves freely within the caged area of the valve, neither floating nor sinking, providing that the ball's specific weight is substantially equal to the weight of the surrounding fluid, as noted.

For the ball to have a specific weight substantially equal to that of the surrounding fluid, balls made, for example, of materials that have a much greater specific weight than the intended fluid, such as for example, water, can be, for example, hollow, or porous internally. Such an exemplary porous ball must have a non-porous outer surface, such as a ceramic coating. In either case, such materials are preferably durable and having a non-porous surface coating that is compatible with the housing material and structurally sound to insure long term maintenance free performance.

Properly installed, an exemplary BFP is invisible, chemically resistant and can be performance tested by remote means. Such a ball can, for example, prevent the possibility of any backflow either accidentally, or by the intentional injection of a toxic liquid contaminant into a building's drinking water supply system by using a hose and small electrically operated pump that is capable of reversing the hydraulic flow in a drinking water supply system and injecting a toxic liquid or contaminants (such as, for example, stored in a container, tub or pool in a private residence) into the building and from there into the city's water supply.

In exemplary embodiments of the present invention, an insertable backflow preventer can be installed, i.e., inserted, or, for example, by employing a uniquely designed control/backflow prevention valve or "extension coupling" either having an internal check valve connected as deemed appropriate, to the discharge (downstream) end of NPS pipe or tubing, as appropriate, that will become exposed when the water shut-off valve that controls the flow to a water fixture, e.g., bathroom, janitor's closet, etc, is removed exposing the pipe (or tube) end. In such embodiments water pressure can be terminated at the upstream side of the shutoff valve before any attempt is made to remove the shutoff valve. The water shut-off valve can be temporarily removed exposing the end of the NPS pipe, which is connected to the existing building's water supply distribution plumbing system. Once the insertable backflow preventer is installed (inserted into the exposed end of the NPS pipe) the shut-off valve can be, for example, reconnected and made operational. A combination control/backflow prevention valve in a similar vein can replace the existing pipe or "sweated" water supply shut-off valve that is affixed to a pipe or copper tubing.

As noted a prophylactic water supply system upgrade could be done at the terminus where the water supply control shut-off valves for the various water fixtures for a bathroom, kitchen, janitor's closet, drinking water fountain, etc., are located. Or, alternatively, such installation could be done at other locations within a building as may be desired.

The present invention overcomes the limitations of the prior art by providing means to prevent an accidental or willful internal cross connection of a building and/or regional municipal potable water supply distribution system, in manner that is truly cost-effective.

An exemplary BFP can be easily and quickly installed in any plumbing configuration, i.e., vertical, horizontal, or inclined. It can operate properly under a wide range of normal flow rates for a given pipe size, and can perform as intended when subjected to exceptionally low backflow rates and differential pressures. The valve can be self-cleaning, and due to the specific weight being substantially equal to the fluid's, its operation can be unaffected by, and not dependent upon, gravity.

With reference to FIGS. 1-2, washer 10 can be made, for example, of a polymer material, however, such washer is not necessary when the BFP is provided in a copper tube that has a soldered connection creating a leak proof seal between the valve and copper tube. Flange 50 as well as the BFP's materials can be, for example, engineered to withstand elevated material stresses due to flow reversal, such as water hammer, that could be generated when an attempt is made to introduce a substance into a building's water supply distribution system, by means that will exceed the buildings water supply pressure. As noted, the outer diameter of the flange and washer can be the same size as that of the end of the NPS pipe thread or copper tubing, if the latter is used with a compression fitting, providing means for the shutoff valve, or Union, to be easily reconnected, once the insertable backflow preventer is properly seated inside the NPS pipe and the shutoff valve or union is reconnected.

In exemplary embodiments of the present invention re-plumbing is not necessary to install a BFP as existing piping lengths are maintained. Additionally, other locations in a facility's water supply piping distribution system besides upstream of shut-off valves leading to fixtures can, for example, be selected, such as, for example, a pipe junction, where two pipes are connected by a pipe coupling or extension adapter.

Once installed, in exemplary embodiments of the present invention an insertable backflow preventer, or a combination control/backflow prevention valve, the latter consisting of an integrated shutoff valve and a BFP according to an embodiment of the present invention, can dramatically improve the internal security of a potable water supply distribution system in a building; preventing means by which one could, with relative ease, successfully introduce or inject a contaminant using a hose and electrically operated liquid pump, or other such means into the buildings water supply system via a fixture. It is noted that a pump with an operating discharge pressure rating that is greater than a building's water pressure can easily inject a toxic fluid into the building's plumbing system, and once online completely unattended. Such an injection process could involve (i) connecting a discharge hose that is connected to the discharge end of the electrical pump to a water fixture (spout) or shutoff valve; (ii) with the supply (suction) hose connected to the pump's suction end, placing the other end of the hose into a nearby container, tub or even a residential pool, holding toxic contaminants; and (iii) opening the fixture's water supply faucet (valve) and turning on the pump. The toxic fluid held in the container, tub or pool can be thus completely emptied, being automatically injected by the pump's action into a water supply system and possibly a municipal potable water supply system, without any need for further personal attention.

According to another exemplary form of the invention a single unitary thin wall cylindrical valve body can have, for example, an elongated barrel with a recessed retaining screen—the recessed design eliminating any solder from dripping onto the radial spokes and axial hub (with hole therethrough) at the flanged end when the apparatus is used with copper/soldered tubing to insure complete insertion into the tubing, rendering it invisible to the naked eye and tamperproof. A washer is not required when the apparatus is inserted in a copper tube with soldered connections.

A unique aspect of the invention is the use of a freely suspended object that is immersed in a fluid with the same, or nearly same, specific weight. Such design provides simple yet effective means whereby the fluid can instantly control the desired functional position of the object. Such an object can be a sphere, as illustrated above, or, for example, can take any shape or form, e.g., a cone or cylinder, depending on the specific application.

According to another exemplary form of the invention, an exemplary BFP can form an integral part a conventional water meter, where such BFP is located on the upstream (normal flow) side of the water meter to minimize head loss during periods of normal flow.

Thus, a BFP according to an exemplary embodiment of the present invention can provide a self cleaning, super-low head loss and cost-effective valve that can protect an individual building's water supply system or that of a municipal waterworks from being compromised by either an accidental or intentional cross connection. Such a BFP obviates any need to completely replace the pipes in a building or municipal piping system when there was exposure to a hazardous persistent contaminant, an agent that simply cannot be flushed out of the building's or the municipality's potable water supply pipe distribution system.

Such an exemplary BFP:

1. With relative ease can be quickly installed, i.e., inserted into existing or new pipe or copper tubing in the shortest time possible, and unlike conventional backflow preventers is not visible to the naked eye, is chemically resistant and essentially tamperproof;

2. Is mechanically simple with only one moving part, a ball, that is self-cleaning, insuring extended maintenance and trouble free operation;

3. Is housed in a valve body that has a flow transition zone to minimize hydraulic head loss when the check valve is operating in the normally open position;

4. Has an orifice with a recessed edge design that will enhance sealing characteristics when flow reverses and the ball is forced onto the seat, said ball having the characteristics of moving freely off the (closed position) seat when fluid flow returns to the proper (normal) direction.

6. Provides means to easily ascertain if said backflow prevention valve insert is working properly, without having to expose or remove it from within the facilities water supply distribution pipe or system. Such a test can be performed by connecting a fluid injecting apparatus to the appropriate shutoff valves fixture spout, then opening the fixture valve, activating the pump and observing system pressure and fluid flow;

7. Is easier to manufacture, install and service than conventional backflow preventers, which are inherently massive, mechanically complex and because of their mechanical complexity prone to malfunctions.

Fire Hydrant Security

In exemplary embodiments of the present invention, fire hydrant security can be enhanced using one or more BFP(s), albeit with a shorter inlet transition to minimize space requirements in certain applications.

Existing hydrants, such as are shown in FIGS. 26-30 and 32, can be modified to prevent the possibility of accidental or the intentional introduction (backflow) of a toxic agent, by simply retrofitting them with two series BFPs. The check valve(s) can, for example, be housed as follows: the first (upstream, normal flow) valve can, for example, be installed, in the horizontal, exposed outlet of the hydrant, the gasket and flange of the backflow valve in compressive contact with the exposed end of the hydrants outlet. The check valve can contain a ball with a specific weight that is close to, or equal, to the specific weight of water. The threaded female end of an assembly consisting of a 45 degree elongated elbow can then be connected to the hydrant's male threaded outlet and permanently fixed, for example, tack welded, to the hydrant's outlet in a manner that said elbow makes a 45 degree angle with the horizontal. The exemplary assembly can have a second backflow check valve (downstream of the first valve), that when installed, for example, tack welded to the hydrants threaded outlet, is not visible even by peering inside the housing pipe opening with the naked eye.

The specific weight of the ball in the second (downstream) backflow valve can, because of the physical orientation of its orifice and seat, have the lowest specific weight technically possible, effectively preventing the reverse of any fluid or pressurized gas that exceeds system water pressure, or otherwise having a sufficient force to seat the check ball into the valves orifice. Valves positioned in this manner can, for example, use housing and ball materials approved by the NSF, such as, for example, 304 L stainless steel. It is noted that the balls must be hollow if 304L stainless steel or titanium is selected to meet the specific weight criteria described above.

As shown in FIGS. 32-35 new hydrants can, for example, be equipped with either one BFP, or, for example, two or more in series. Such an assembly can prohibit the injection of fluids having physical properties that have extremely low or high specific weights, such as, for example, naptha, a liquid when slightly chilled having a specific weight of 0.67, carbon tetrachloride a liquid having a specific weight of 1.59, or lethal gases such as, for example, chlorine, phosgene, etc.

Figure 33:
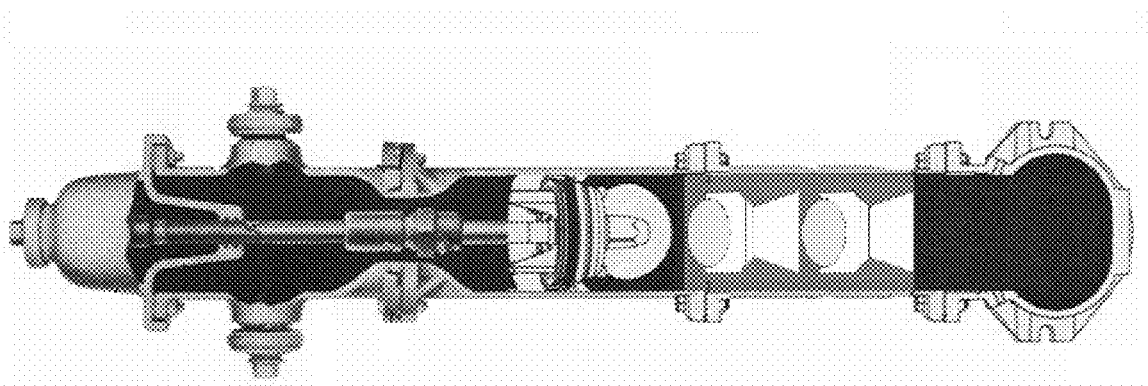
FIG. 33 depicts the exemplary fire hydrant of FIG. 32 with dual BFP internal inserts according to an exemplary embodiment of the present invention.

Given the possible introduction of toxic liquids and/or gases with varying specific weights it is imperative that such an exemplary series configuration be employed to effectively address extremes in specific weight and other chemical factors. The valve's simple design replicates, and can even exceed, conventional dual check valve performance expectations established by appropriate regulatory entities. As shown in FIG. 33 the exemplary check valve(s) can be installed in a vertical orientation inside the lower section of a hydrant's barrel, immediately below the hydrants valve seat, with retaining screen always oriented upwardly. Valve housing and check valve balls materials selected would only be those approved by appropriate certifying entities, e.g., the NSF. The balls would be hollow if 304L stainless steel, or some other metal alloy like titanium is employed, or solid ceramics or thermoplastics with specific weights that are substantially more than the fluid (water), equal to fluid, or heavier than the fluid (liquid) based the valves' orientation in the hydrant or lateral water supply line. Other ball specific weight and material properties, critical selection factors, must be considered when addressing the introduction of lethal gases and/or toxic liquids, when more than one check valve is employed.

FIGS. 34 and 35 depict one or more BFPs located inside a hydrant's water supply pipe in a lateral position that is between the hydrant's street shutoff valve and the hydrant, i.e., inside the water supply pipe lateral that is upstream of, and connected to, the hydrant, and, downstream of the shutoff that controls the flow into the hydrant. Check valves placed in the lateral pipe drinking water supply pipe, which is essentially horizontal, would use balls with specific weights that are close or equal to the specific weight of water.

Modifications and alternative embodiments of the invention will be apparent to those skilled in the art in view of the foregoing description. This description is to be construed as illustrative only, and is for the purpose of teaching those skilled in the art the best mode of carrying out the invention. The details of the structure and method may be varied substantially without departing from the spirit of the invention and the exclusive use of all modifications, which come within the scope of the appended claims is reserved.

What is claimed:

1. A valve, comprising:
a valve body;
a retaining screen at a distal end;
a ball seat at a proximal end portion; and
a ball;
wherein the valve body has an outer diameter, said outer diameter being constant between the distal end and the proximal end, wherein the ball is caged between the retaining screen and the ball seat,
wherein the ball has a specific weight that is a defined function of the specific weight of a fluid to be sent through the valve,
and wherein in forward flow the ball is positioned inside the retaining screen, allowing fluid to pass, but under a backflow pressure introduced distally to the retaining screen, the ball seats in the ball seat, and backflow is prevented.

2. The valve of claim 1, wherein the valve body has a flange provided on its outside at one end.

3. The valve of claim 2, wherein the flange has an outside diameter that allows the valve to be inserted into an inlet side of a shutoff valve or connection fitting.

4. The valve of claim 1, wherein the valve body has an outside diameter that provides for the unobstructed insertion of the valve into a pipe or tubing such that when completely installed the valve is not visible.

5. The valve of claim 1, wherein the ball seat defines an annular surface in a plane normal to the flow path, and wherein the seat is operable to closably seat the ball when fluid flow is in the backflow direction.

6. The valve of claim 1, wherein in operation the ball is totally immersed in a contained fluid, and wherein said fluid and the ball have substantially equal specific weights.

7. The valve of claim 1, wherein the retaining screen has a concave surface on the upstream side, and has equidistant radial spokes, each pair of spokes being respectively separated by port holes, and a circular hub seat having a hole therethrough at the intersection of the spokes.

8. The valve of claim 1, wherein the hub is at substantially the axial center of the retaining screen and the valve body.

9. The valve of claim 1, wherein the valve body is cylindrical.

10. The valve claim 1, having a flange washer in compressive contact with the flange and a exposed edge of a pipe and/or tube when the valve is inserted into said pipe or tube.

11. The valve of claim 1, wherein the retaining screen has a concave surface on its upstream face, and three equidistant radial spokes, each spoke respectively separated by port holes, each spoke having a tapered trailing edge on a downstream side of the spoke and a flat leading edge on an upstream side of the spoke, wherein the retaining screen has a concave axial hub/ball seat at the intersection of the three radial spokes, with a hole therethrough.

12. The valve of claim 1, wherein the valve body has a flow transition zone to minimize hydraulic head-loss when the valve is in a normally open position.

13. The valve of claim 1, wherein an orifice incorporates a recessed mating edge surface to enhance sealing characteristics when the valve is in a closed position.

14. The valve of claim 1, wherein the valve can be maintained and without being removed from a pipe or tube.

15. An integrated control/backflow prevention valve assembly, comprising:
a valve according to claim 1; and a control shutoff valve.

16. An extension adapter that includes at least one valve of claim 1, said extension adapter capable of being affixed to a fluid supply line.

17. A water supply meter that includes at least one valve of claim 1, said meter capable of being affixed to a fluid supply line.

18. A fire hydrant that includes at least one valve of claim 1, said fire hydrant capable of being affixed to a fluid supply line.

19. A control system comprising:
a suspended object totally immersed in a fluid, wherein said fluid and object immersed therein have substantially the same specific weights, said fluid contained by a cylindrical tube with a seat for the object at one end portion and a retaining screen at the other end, said cylindrical tube having an outer diameter that is constant between the seat and the retaining screen,
wherein in operation said fluid can instantly control and direct the suspended object to:
a first functional position under normal flow, and
a second functional position under abnormal flow.

20. The control system of claim 19, wherein at least one of:
(i) the suspended object has the shape of one of a sphere, cone or cylinder
(ii) the suspended object is either hollow or porous within
(iii) the suspended object has a non-porous outer shell.

* * * * *